US012202256B2

(12) United States Patent
Saito

(10) Patent No.: US 12,202,256 B2
(45) Date of Patent: Jan. 21, 2025

(54) PRINTING DEVICE, AND NON-TRANSITORY COMPUTER-READABLE RECORDING MEDIUM FOR PRINTING DEVICE

(71) Applicant: Brother Kogyo Kabushiki Kaisha, Nagoya (JP)

(72) Inventor: Shingo Saito, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 150 days.

(21) Appl. No.: 18/057,794

(22) Filed: Nov. 22, 2022

(65) Prior Publication Data

US 2023/0173829 A1 Jun. 8, 2023

(30) Foreign Application Priority Data

Nov. 30, 2021 (JP) ................................ 2021-195010

(51) Int. Cl.
*B41J 11/70* (2006.01)

(52) U.S. Cl.
CPC .................................... *B41J 11/70* (2013.01)

(58) Field of Classification Search
CPC ........ B41J 11/703; B41J 11/70; B41J 2/2132; B41J 11/0005; B41J 11/005; B41J 15/04
See application file for complete search history.

(56) References Cited

U.S. PATENT DOCUMENTS

2010/0045726 A1 2/2010 Nakajima et al.
2013/0271518 A1* 10/2013 Morita .................. B41J 25/308 347/8
2021/0300083 A1* 9/2021 Yamaguchi ............. B41J 29/13

FOREIGN PATENT DOCUMENTS

JP 2010-046935 A 3/2010
JP 2013-086235 A 5/2013

* cited by examiner

*Primary Examiner* — Jannelle M Lebron
(74) *Attorney, Agent, or Firm* — Element IP, PLC

(57) ABSTRACT

A printing device comprises a housing, a print head provided in the housing, a mount to which a roll body is detachably mounted, a conveyor configured to convey a printing medium unwounded from the roll body along a conveying path including an upstream path extending from the mount to the print head, and a cutter configured to cut the printing medium at a particular position in the upstream path. The roll body is a sheet type printing medium wounded into a rolled-up state. The conveyor comprises a holder arranged, in the upstream path, at a position between the cutter and the print head. The holder is configured to hold the printing medium in a state where the printing medium is deformed to be corrugated along a direction perpendicular to the conveying direction.

11 Claims, 20 Drawing Sheets

EXCESS AMOUNT VO IS LARGE (BASIC CONFIGURATION)

EXCESS AMOUNT VO IS LARGE (BASIC CONFIGURATION)

FIRST EMBODIMENT

EXCESS AMOUNT VO IS MEDIUM

EXCESS AMOUNT VO IS MEDIUM

FIRST EMBODIMENT

EXCESS AMOUNT VO IS SMALL

FIRST EMBODIMENT

EXCESS AMOUNT VO IS SMALL

SECOND EMBODIMENT

EXCESS AMOUNT VO IS SMALL
(BASIC CONFIGURATION)

VARIABLE CONVEYANCE AMOUNT TVv IS LARGE (EXCESS AMOUNT VO IS SMALL)

PRINTING DEVICE, AND NON-TRANSITORY COMPUTER-READABLE RECORDING MEDIUM FOR PRINTING DEVICE

REFERENCE TO RELATED APPLICATIONS

This application claims priority from Japanese Patent Application No. 2021-195010 filed on Nov. 30, 2021. The entire content of the priority application is incorporated herein by reference.

BACKGROUND ART

The present disclosures relate to a printing device, and more specifically, to a controlling device of a print engine provided with a print head having i nozzles and a conveying device configured to convey a printing medium, relative to the print head, in a conveying direction.

There has been known a printer configured to perform printing on a roll sheet. An example of such a printer is an inkjet printing device provided with a sheet cutter on a downstream side, along a conveying path, with respect to a recording head. The sheet cutter is configured to cut out a printed portion of the rolled sheet.

DESCRIPTION

When removing a rolled sheet from a housing of the recording device, there is a case in which an unwound leading end of the rolled sheet is re-wound to prevent the unwound leading end from contacting the housing and being bent thereby. In such a case, according to the above-described conventional art, the sheet is cut at a position on a downstream side with respect to the recording head in the conveying path, the unwound leading end of the rolled sheet is relatively long. Then, according to the above-described example, relatively a large amount of rolled sheet is to be re-wound, and it takes a relatively long time to re-wind the leading end of the rolled sheet.

According to aspects of the present disclosure, there is provided a printing device, comprising a housing, a print head provided in the housing, a mount to which a roll body is detachably mounted, the roll body being a sheet type printing medium wounded into a rolled-up state, a conveyor configured to convey the printing medium unwounded from the roll body a conveying direction along a conveying path including an upstream path extending from the mount to the print head, and a cutter configured to cut the printing medium at a particular position in the upstream path. The conveyor comprises a holder arranged, in the upstream path, at a position between the cutter and the print head. The holder is configured to hold the printing medium in a state where the printing medium is deformed to be corrugated along a direction perpendicular to the conveying direction.

Further, according to aspects of the present disclosure, there is provided a non-transitory computer-readable recording medium for controlling a printing device. The non-transitory computer-readable storage medium contains computer-executable instructions. The printing device comprises a housing, a print head provided in the housing, a mount to which a roll body is detachably mounted, the roll body being a sheet type printing medium wounded into a rolled-up state, a conveyor configured to convey the printing medium unwounded from the roll body a conveying direction along a conveying path including an upstream path extending from the mount to the print head, and a cutter configured to cut the printing medium at a particular position in the upstream path. The conveyor comprises a holder arranged, in the upstream path, at a position between the cutter and the print head. The holder is configured to hold the printing medium in a state where the printing medium is deformed to be corrugated along a direction perpendicular to the conveying direction. The print head comprises multiple nozzles configured to eject ink of particular colors, respectively, the multiple nozzles being arranged in such a manner that positions of the multiple nozzles are different from each other in the conveying direction, each of the multiple nozzles being configured to eject ink to form dots on the on the printing medium. The computer-executable instructions realizes a controlling function. The controlling function can cause, when executed by a controller of the printing device, the printing device to perform multi-pass printing. The multi-pass printing is printing of executing partial printing of forming dots using the print head and sheet conveyance of conveying the printing medium using the conveyor, alternately and repeatedly, to print multiple raster lines consecutive in the conveying direction by the multiple partial printings. Further, the controlling function causes, when executed by the controller, the printing device to perform a first conveyance operation of conveying the printing medium, and the partial printing after the first conveyance operation by multiple times, a second conveyance operation of conveying the printing medium by a conveyance amount smaller than a conveyance amount in the first conveyance operation, and the partial printing after the second conveyance operation, and a third conveyance operation of conveying the printing medium by a conveyance amount larger than the conveyance amount in the first conveyance operation, and the partial printing after the third conveyance operation. The third conveyance operation being an operation of conveying the printing medium from a start position to an end position, the start position being a position at which an upstream end of the printing medium is held by the holder, the end position being a position at which the upstream end of the printing medium is not held by the holder. The controlling function can further cause, when executed by the controller, the printing device to perform adjusting at least one of a number of the second conveyance operation and the conveyance amount in the second conveyance operation in such a manner that the upstream end of the printing medium is located within a particular range when the printing medium is located at the start position of the third conveyance operation. The particular range is a range set to the holder in the conveying direction.

FIG. 1 is a block diagram showing a configuration of a printer according to an embodiment.

FIG. 2 schematically shows a configuration of the printing mechanism.

FIG. 3 schematically shows a configuration of the printing mechanism.

A. First Embodiment

A-1. Configuration of Printer

Figure 1:
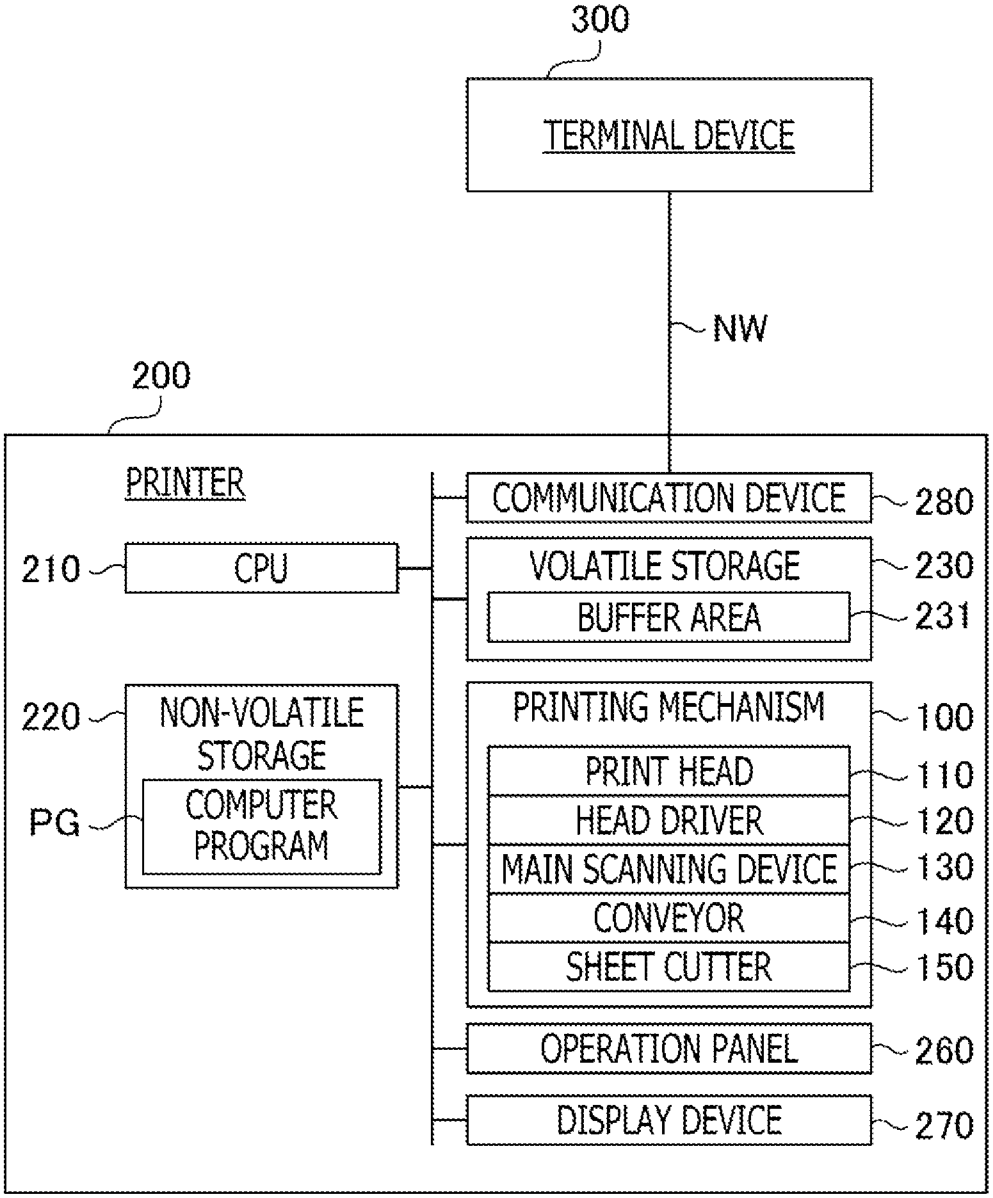

Referring to the accompanying drawings, a configuration of a printer 200 according to a present embodiment will be described. FIG. 1 is a block diagram showing a configuration of the printer 200 according to a first embodiment.

The printer 200 includes, for example, a printing mechanism 100 as a print execution unit, a CPU 210 as a controller, a non-volatile storage 220 such as a hard disk drive, a volatile storage 230 such as a RAM, and an operation panel 260 such as buttons and a touchscreen panel for receiving user operations, a display device 270 such as a liquid crystal display, and a communication device 280. The communication device 280 includes a wired or wireless interface to connect to a network NW. The printer 200 is communicatively connected to an external device, e.g., a user's terminal device 300, via communication device 280.

The volatile storage 230 provides a buffer area 231 configured to temporarily store various intermediate data that is generated when the CPU 210 performs various processes. The non-volatile storage 220 is configured to store a computer program PG. According to the present embodiment, the computer program PG is a control program for controlling the printer. The computer program PG is stored in the non-volatile storage 220 when the printer 200 is shipped. Alternatively, the computer program PG may downloadable from a server, or provided by being stored in a storage medium such as a DVD-ROM. By executing the computer program PG, the CPU 210 executes, for example, a printing process which will be described below. In this way, the CPU 210 controls the printing mechanism 100 to print an image on a printing medium (e.g., a printing sheet).

The printing mechanism 100 is configured to form dots on a sheet M using cyan (C), magenta (M), yellow (Y), and black (K) inks (droplets), thereby performing color printing. The printing mechanism 100 includes a print head 110, a head driver 120, a main scanning device 130, a conveyor 140, and a sheet cutter 150.

Figure 2:
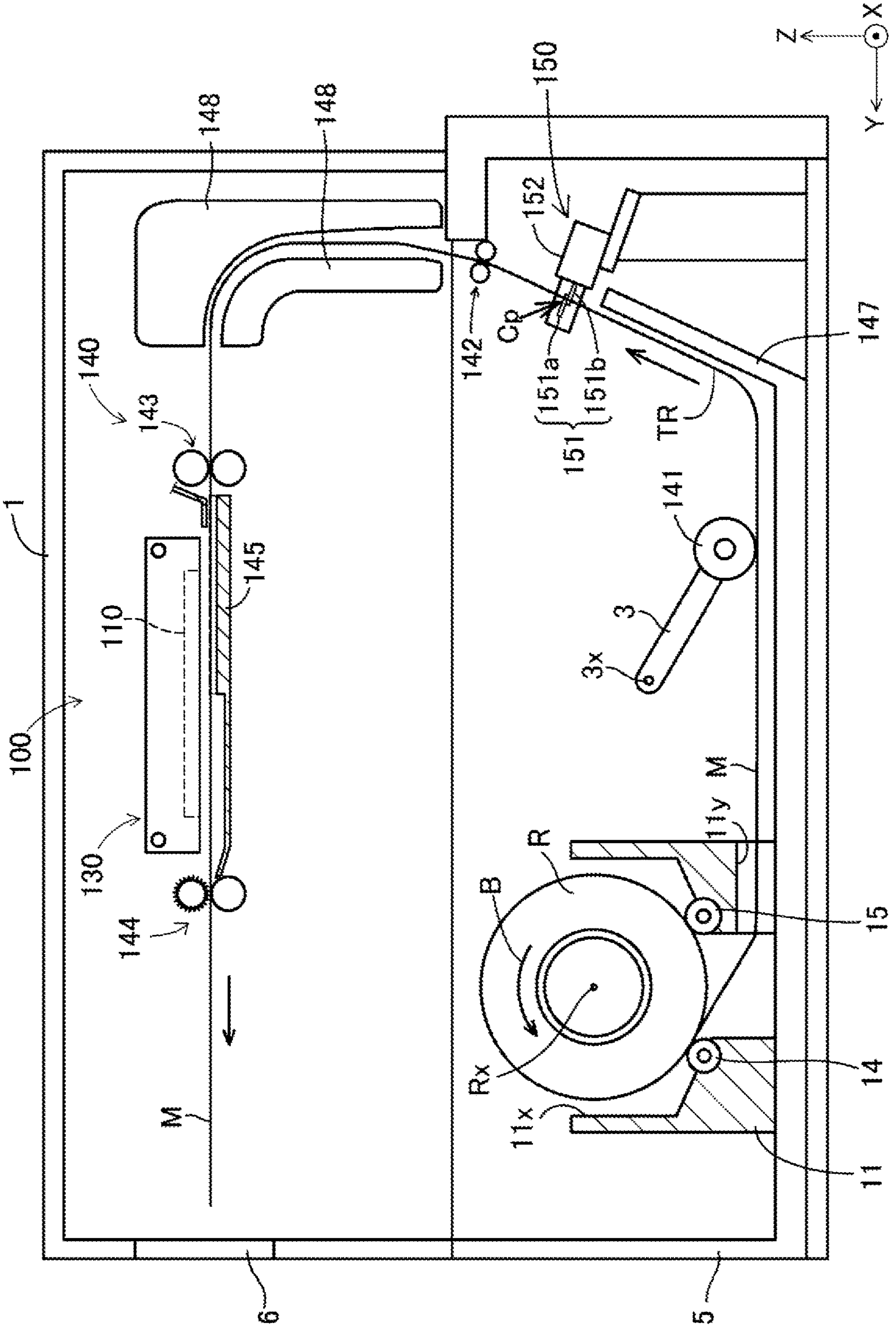
Figure 3:
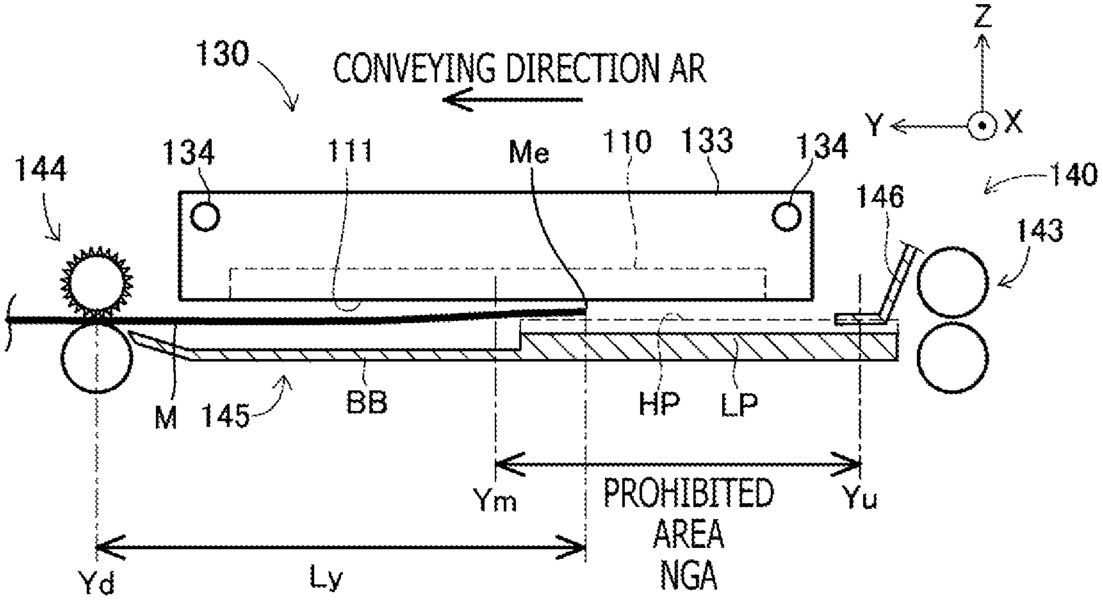

FIG. 2 schematically shows a configuration of the printing mechanism 100. FIG. 3 is an enlarged view of a part of FIG. 2 and shows a portion near the print head 110. As shown in FIG. 2, each of the components 110-150 of the printing mechanism 100 are accommodated in a housing 1 of the printer 200. X and Y directions in FIG. 2 are horizontal directions, and Z direction is a vertical direction.

As shown in FIG. 2, the printing mechanism 100 further includes a sheet feeding tray 5, a roll mount 11 inside the sheet feeding tray 5, and a sheet discharge tray 6 into which printed sheets are discharged. The sheet feeding tray 5 is, for example, box-shaped with an upward opening and is configured to be attached to and detached from a lower part of the housing 1. The sheet discharge tray 6 is configured by an upper front side wall of the housing 1 and is configured to be opened and closed with respect to the housing 1.

In the roll mount 11, a roll R, which is formed by winding a long sheet M into a cylindrical shape, is removably mounted. The roll body R is mounted in a recess 11*x* formed in the roll mount 11 in such a manner that an axis Rx of the roll body R is parallel to a X direction indicated in FIG. 2. The roll body R is rotatably supported by the rollers 14 and 15 so as to be rotatable in a rotation direction B about an axis Rx with being mounted in the roll mount 11. A long hole 11*y* extending in the X direction is formed on a lower part of roll mount 11.

The conveyor 140 is configured to convey the sheet M unwound from the roll body R along a conveying path extending from the long hole 11*y* of the roll mount 11 to the sheet discharge tray 6 via a space between the print head 110 and a sheet table 145 (described later).

The conveyor 140 includes, from an upstream side to a downstream side of the conveying path, a feeding roller 141, an intermediate roller pair 142, a conveying roller pair 143, a discharging roller pair 144, a sheet table 145, and guide members 147 and 148 in this order.

The feeding roller 141 is axially supported at an end part of an arm 3. The arm 3 is supported so as to be rotatable around a supporting axis 3*x*, and is urged in such a manner that the feeding roller 141 approaches a bottom surface of the sheet feeding tray 5. The feeding roller 141 is driven by a feeding motor (not shown) in a state where the roll body R is mounted in the roll mount 11 to feed the sheet M unwound from the roll body R.

Each of the intermediate roller pair 142, each of the conveying roller pair 143 and the discharging roller pair 144 has a driving roller that is driven to rotate by a not-shown conveying motor, and a driven roller configured to rotate in association with the rotation of the driving roller. Each of these roller pairs is configured to sandwich the sheet M between the driving roller and the driven roller and convey the sheet M along the conveying path.

The guide member 147 is arranged between the feeding roller 141 and the intermediate roller pair 142 in the conveying path. The guide member 148 is arranged between the intermediate roller pair 142 and the conveying roller pair 143 in the conveying path. By the guide members 147 and 148, the sheet M is guided along the conveying path.

As shown in FIG. 3, the main scanning device 130 has a carriage 133 and sliding shafts 134. The carriage 133 is configured to mount the print head 110. The sliding shafts 134 slidably support the carriage 133 in such a manner that the carriage 133 can be reciprocated in a main scanning direction (i.e., the X direction in FIG. 3). The main scanning device 130 makes the carriage 133 reciprocate along the sliding shafts 134 (i.e., perform scanning) with use of a driving force of a main scanning motor (not shown). In this way, the main scanning is realized in which the print head 110 is reciprocated along the main scanning direction with respect to the sheet M.

As shown in FIG. 3, in the vicinity of the print head 110, the conveyor 140 conveys the sheet M in a conveying direction AR (i.e., +Y direction in FIG. 3) which intersects with the main scanning direction) with holding the sheet M between the print head 110 and the sheet table 145. In the following description, an upstream side (i.e., −Y side) in the conveying direction AR may also merely be referred to as an upstream side, and a downstream side (i.e., +Y side) in the conveying direction AR may also merely be referred to as a downstream side.

As shown in FIG. 3, the conveying roller pair 143 described above is configured to hold the sheet M on the upstream side (i.e., −Y side) with respect to the print head 110, and the discharging roller pair 144 is configured to hold the sheet M on the downstream side (i.e., +Y side) with respect to the print head 110. The sheet table 145 is arranged at a position between the conveying roller pair 143 and the discharging roller pair 144, and faces a nozzle-formed surface 111 of the print head 110.

The head driver 120 (FIG. 1) provides a drive signal to the print head 110 to drive the print head 110 while the main scanning device 130 performs the main scanning of the print head 110. In accordance with the drive signal, the print head 110 ejects ink on the sheet being conveyed by the conveyor 140 to form dots.

Figure 4:
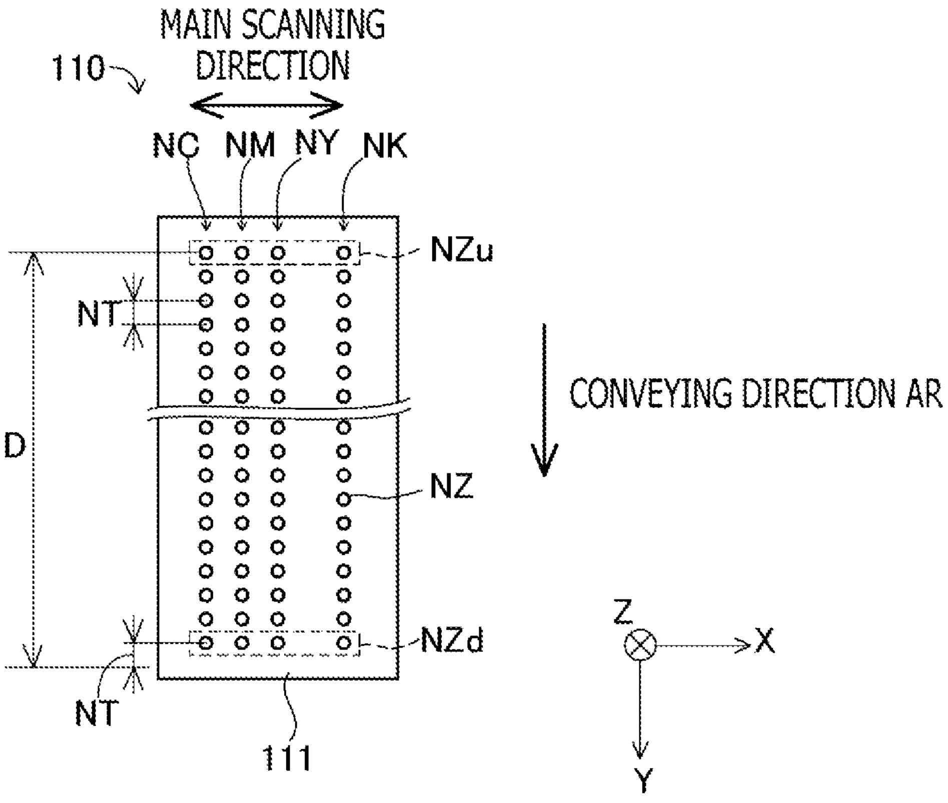
FIG. 4 shows a configuration of a print head.

FIG. 4 shows a configuration of the print head 110 viewed from the −Z side (i.e., from the lower side in FIG. 2). As shown in FIG. 4, on the nozzle-formed surface 111 of the print head 110, multiple nozzle rows each having multiple nozzles (i.e., the nozzle rows NC, NM, NY and NK respectively configured to eject the C, M, Y, and K ink droplets described above) are formed. Each of the nozzle rows contains a plurality of nozzles NZ aligned along the conveying direction AR.

The plurality of nozzles NZ differ from each other in positions in the conveying direction AR (+Y direction) and are arranged at a particular nozzle spacing NT. The nozzle spacing NT is a distance between every two adjacent nozzles in the conveying direction AR among a plurality of nozzles NZ. Among the nozzles that compose these nozzle rows, the nozzle NZ located at the most upstream side (i.e., −Y side) is also called as the most upstream nozzle NZu. Further, among the nozzles that compose these nozzle rows, the nozzle NZ located at the most downstream side (i.e., +Y side) is also called as the most downstream nozzle NZd. The length, in the conveying direction AR, from the most upstream nozzle NZu to the most downstream nozzle NZd, plus the nozzle spacing NT, is also referred to as a nozzle length D. Nozzle length D is expressed in units of the number of nozzles contained in each nozzle row. It should be noted that, in an actual product, there are cases in which, among the plurality of nozzles NZ, the nozzles NZ near both ends in the conveying direction AR are not used for printing. However, in the present embodiment, a case in which printing is performed using all the nozzles NZ corresponding to the entire nozzle length D will be described as an example. The nozzles NZ used for printing in the present embodiment are referred to as usable nozzles.

Positions of the nozzle rows NC, NM, NY and NK in the main scanning direction (i.e., X direction in FIG. 4) are different from each other, while positions of the nozzle rows NC, NM, NY and NK in the conveying direction AR (i.e., Y direction in FIG. 4) overlap each other. For example, in FIG. 4, the nozzle row NK is arranged on the +X side with respect to the nozzle row NY configured to eject the Y ink.

The sheet cutter 150 is arranged between the guide member 147 and the intermediate roller pair 142 in the conveying path. The sheet cutter 150 is configured to cut the sheet M at a particular position Cp on an upstream path TR that is a part of the conveying path from the roll mount 11 to the print head 110. The sheet cutter 150 has a cutter 151 and a moving mechanism 152 to which a cutter 151 is attached. The cutter 151 is configured such that, when cutting, two rotating blades 151*a* and 151*b* sandwich the sheet M. The moving mechanism 152 is a mechanism that reciprocates the cutter 151 (i.e., the rotating blades 151*a* and 151*b*) in the X direction using a driving force of a drive motor (not shown) in accordance with the control of the CPU 210. When not in use, the moving mechanism 152 locates the cutter 151 (i.e., the rotating blades 151*a* and 151*b*) in a position different from a range, in the X direction, where the sheet M exists. When cutting, the moving mechanism 152 moves the cutter 151 in such a manner that the cutter 151 (i.e., the rotating blades 151*a* and 151*b*) crosses the range, in the X direction, where the sheet M exists, thereby the sheet M being cut.

In the present embodiment, since the sheet cutter 150 is arranged in the upstream side of the print head 110, the sheet cutter 150 cuts the sheet M before printing on the sheet M is completed.

Figure 5A:
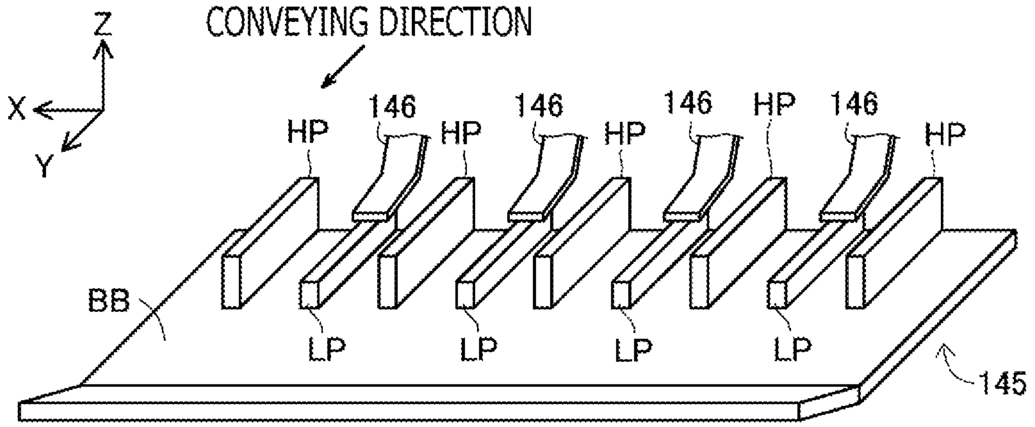
FIGS. 5A and 5B are perspective views each showing a sheet table and a plurality of holding members.
Figure 5B:
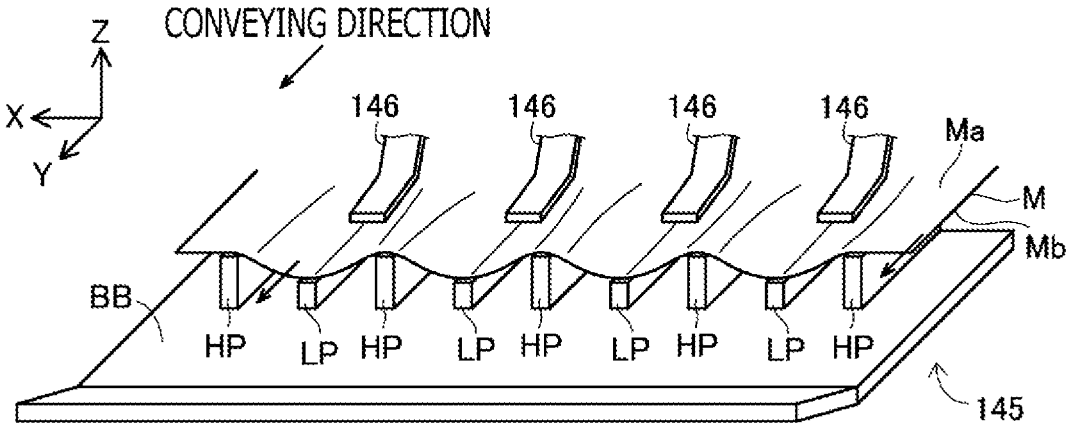

Referring to FIGS. 5A and 5B, the conveyor 140 will be described further. Each of FIGS. 5A and 5B is a perspective view of the sheet table 145 and a plurality of holding members 146. FIG. 5A shows a case where no sheet M is held, while FIG. 5B shows a case where the sheet M is held. The sheet table 145 is provided with a plurality of high support members HP of which positions in the X direction are different from each other, a plurality of low support members LP of which positions in the X direction are different from each other, and a flat plate BB.

The flat plate BB is a plate member substantially parallel with the main scanning direction (S direction) and the conveying direction (+Y direction). An upstream end (i.e., −Y side end) of the flat plate BB is located in the vicinity of the conveying roller pair 143. A downstream end (i.e., +Y side end) of the flat plate BB is located in the vicinity of the discharging roller pair 144.

As shown in FIG. 5A, the plurality of high support members HP and the plurality of low support members LP are alternately aligned, on the flat plate BB, in the X direction. That is, each of the plurality of low support members LP is located between two of the plurality of high support members HP adjacent to the low support member LP. Each of the plurality of support members HP and LP is a rib extending along the Y direction. As shown in FIG. 2A, an upstream end (i.e., −Y side end) of each of the plurality of high support members HP is located at the upstream end of the flat plate BB. The positions of the two ends of each of the plurality of low support members LP in the Y direction are the same as the positions of two ends of the of the plurality of high support members HP in the Y direction.

The plurality of holding members 146 are arranged on the +Z side of the plurality of low support members LP. The positions of the plurality of holding members 146 in the X direction are different from each other and are the same as the positions of the plurality of low support members LP in the X direction, respectively. That is, the position of each of the plurality of holding members 146 in the X direction is located between two adjacent high support members HP in the X direction with respect to the holding member 146. End portions of the plurality of holding members 146 are plate-like members extending in the Y direction. Positions of the plurality of holding members 146 in the Y direction are on the upstream side (−Y side) from the print head 110 and on the downstream side (+Y side) from the sheet cutter 150 and the conveying roller pair 143.

As shown in FIG. 5B, when the sheet M is conveyed, the plurality of high support members HP and the plurality of low support members LP face a surface Mb of the sheet M, which is a surface opposite to a printing surface Ma of the sheet M, from −Z side, thereby supporting the sheet M from the surface Mb side. The plurality of holding members 146 face a printing surface Ma pf the sheet M and press the sheet M from the printing surface Ma side. In this way, the plurality of high support members HP, the plurality of low support members LP, and the plurality of holding members 146 hold the sheet M in a corrugated state in such a manner that ridges and furrows of the sheet M are formed in the X direction (see FIG. 5B). Then, the sheet M is conveyed in the conveying direction (−Y direction) in a corrugated state at the position facing the nozzle-formed surface 111 of the print head 110.

By deforming the sheet M in the corrugated shape, the rigidity of sheet M against deformation along the Y direction can be increased. As a result, it is possible to suppress the sheet M from lifting from the sheet table 145 toward the print head 110 or the sheet M from sagging toward the sheet table 145 due to warping of the sheet M along the Y direction. If the sheet M is lifted up or sagged down, the misalignment of the dot formation position is caused and the quality of the printed image is reduced, e.g., due to banding. When the sheet M is lifted up, the sheet M may contact the print head 110 and be smudged. In particular, in this example, since the sheet M is unwound from the roll body R, the sheet M tends to be deflected, which can cause the sheet M to lift up or sag down. Therefore, the effect obtained by deforming the sheet M into a corrugated shape is significant.

As shown in FIG. 3, when the upstream end Me (the −Y side end cut by the cutter 151) of the sheet M is located in a prohibited area NGA during conveyance, the sheet M is likely to be smudged due to the lifting of the sheet M. The prohibited area NGA is an area where partial printing is prohibited. The prohibited area NGA is set in a range in the Y direction from a position Yu to a position Ym in FIG. 3. A state in which the sheet M is held only by the discharging roller pair 144 and not held by the holding members 146, as shown in FIG. 3, will also be referred to as a one-side held state. In the one-side held state, a length Ly of a part of the sheet M on the upstream side (i.e., −Y side) from the position held by the discharging roller pair 144 in the Y direction will be called as a one-side held sheet length. In the one-side held state, the longer the one-side held sheet length Ly is, the more the upstream end Me of the sheet M tends to be lifted up, and thus the more likely the sheet M is smudged.

The position Yu of the upstream end of the prohibited area NGA is positioned at slightly upstream side (−Y side) from the downstream end (+Y side end) of the holding members 146. In a state where the upstream end Me of the sheet M is located upstream (−Y side) from the position Yu, the sheet M is fully held down by the holding members 146. In this condition, the smudge of the sheet M is unlikely to occur.

The position Ym of the downstream end of the prohibited area NGA is near the center of the range in the Y direction where the print head 110 is located. When the upstream end Me of the sheet M is located at a downstream side (+Y side) with respect to the position Ym, the sheet M is in the one-side held state, in which the sheet M is held only by the discharging roller pair (144), but the one-side held sheet length (Ly) described above is sufficiently short. In this condition, smudge of the sheet M is unlikely to occur.

In contrast, when the upstream end Me of the sheet M is located in the prohibited area NGA, the upstream end Me of the sheet M is located at a downstream side (+Y side) with respect to the position Yu. In this state, the sheet M is not held by the holding members 146, or only a small portion near the upstream end Me is held, and the upstream end Me is easily dislodged from the holding members 146. Furthermore, when the upstream end Me of the sheet M is located in the prohibited area NGA, the upstream end Me of the sheet M is located at an upstream side (on the −Y side) with respect to the position Ym. In this state, the one-side held sheet length Ly described above is long. For this reason, when the upstream end Me of the sheet M is located in the prohibited area NGA, the sheet M is likely to be smudged, as described above. For example, the prohibited area NGA is determined by performing a large number of printing operations while actually changing the position of the upstream end Me of the sheet M.

In the printing process according to the present embodiment, as will be described in detail later, in order to suppress smudge of the sheet M during partial printing, the printer 200 is configured not to perform the partial printing when the upstream end Me of the sheet M is located in the prohibited area NGA.

A-2. Printing Process

The CPU 210 (see FIG. 1) of the printer 200 is configured to execute a printing process based on a printing instruction input by a user via the operation panel 260. The print instruction includes a designation of image data representing an image to be printed.

Figure 6:
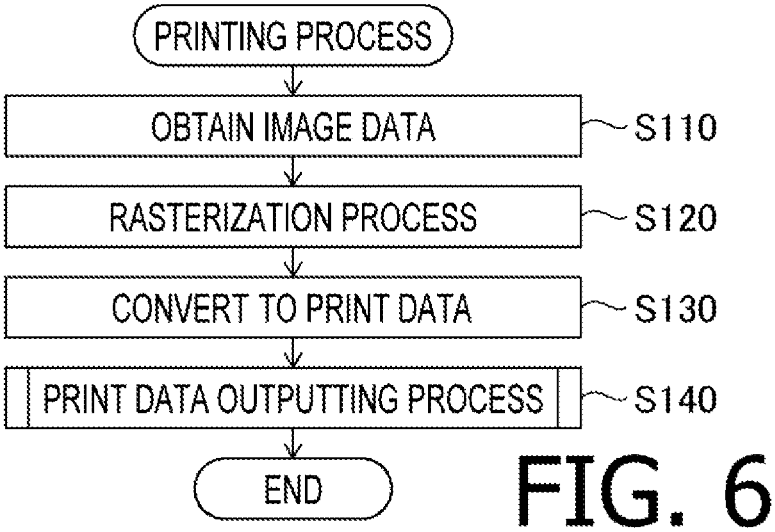
FIG. 6 is a flowchart illustrating a printing process.

FIG. 6 shows a flowchart illustrating the printing process. In S110, the CPU 210 obtains the image data designated by the print instruction from the non-volatile storage 220. Alternatively, the print instruction and the image data may be obtained from the terminal device 300. The obtained image data is image data with various formats, for example, JPEG-compressed image data or image data described in a page description language.

In S120, the CPU 210 performs a rasterization process on the obtained image data to generate RGB image data. The RGB image data is bitmap data containing RGB values for each pixel. The RGB values are, for example, the color values of the RGB color system, which include values of three components: red (R), green (G), and blue (B).

In S130, the CPU 210 converts the RGB image data to print data. Concretely, the CPU 210 performs a color conversion process and a halftone process on the RGB image data. The color conversion process is a process of converting the RGB values of multiple pixels included in the RGB image data into the CMYK values. The CMYK values are the color values of the CMYK color system, including the component values corresponding to the inks used for printing (in this embodiment, the C, M, Y, and K component values). The color conversion process is performed, for example, by referring to a known look-up table that defines the correspondence between the RGB and the CMYK values. The halftone process is a process of converting the color-converted image data into the print data (also called as dot data). The print data is data that represents dot formation state for each CMYK color component on a pixel-by-pixel basis. The value of each pixel in the dot data indicates, for example, the state of dot formation in two gradations of "no dot" and "with dot" or in four gradations of "no dot," "small," "medium," and "large." The halftone process is performed using a known method such as a dither method or an error diffusion method.

In S140, the CPU 210 executes a print data outputting process. The print data outputting process is a process of generating partial print data for each partial printing, which will be described later, adding various control data to the generated partial print data, and outputting the same to the printing mechanism 100. The control data includes data designating a conveying amount of the sheet M to be conveyed before the partial printing is performed. In the print data outputting process, the partial print data is output for the number of partial printings to be executed. The print data outputting process will be described in detail later.

By executing the printing process, the CPU 210 causes the printing mechanism 100 to print the print image PI. Concretely, the CPU 210 controls the head driver 120, the main scanning device 130 and the conveyor 140 to perform the partial printing and the sheet conveyance alternately and repeatedly to perform printing. In a single partial printing, ink is ejected from the nozzles NZ of the print head 110 onto the sheet M during one main scanning cycle of the print head 110 with the sheet M being stopped on the sheet table 145, thereby a part of the image to be printed is printed on the sheet M. In one sheet conveyance, the sheet M is conveyed in the conveying direction AR by the amount determined in the print data outputting process.

Figure 7:
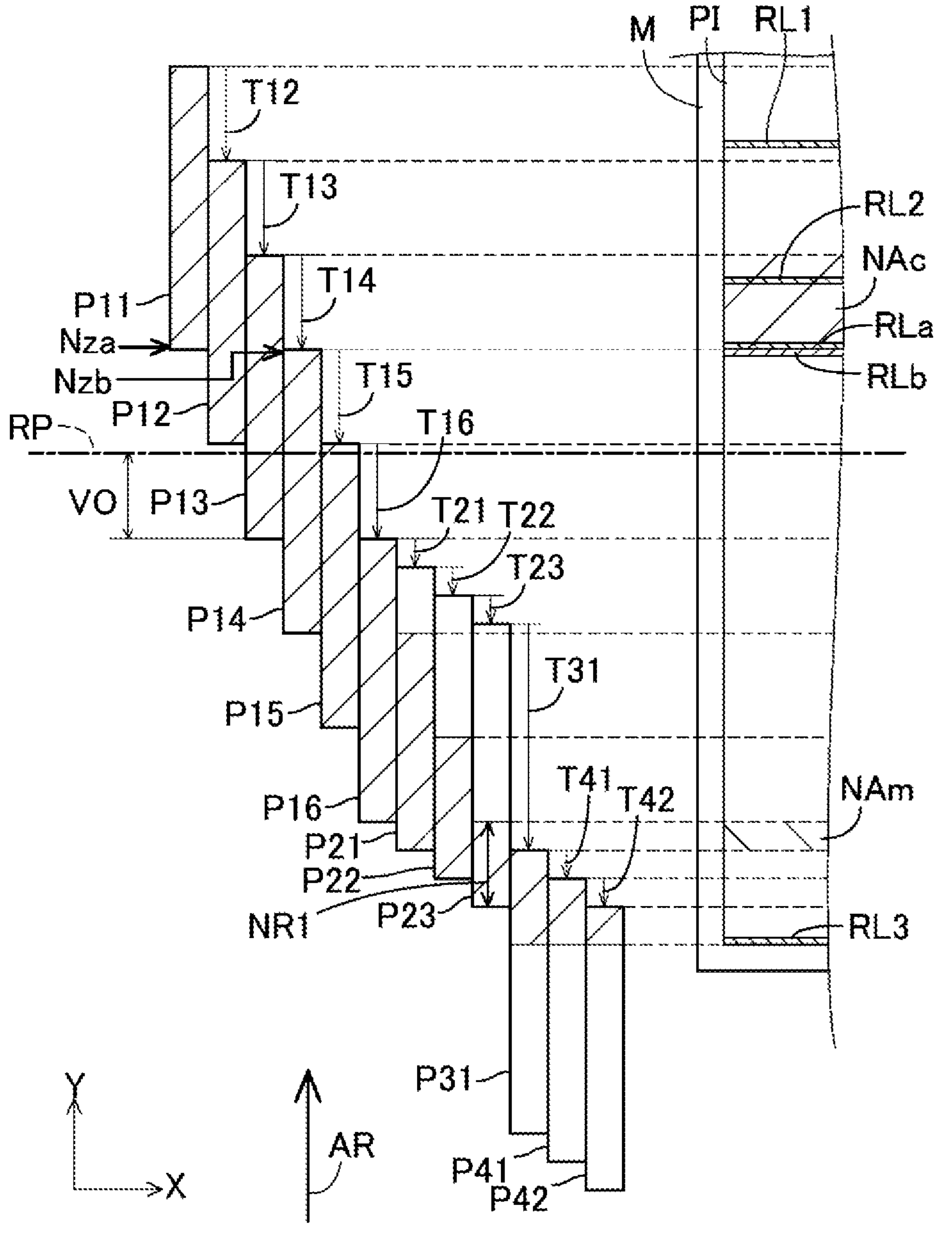
FIG. 7 is a first illustration of the printing according to the first embodiment.

FIG. 7 is a first illustration of printing according to the first embodiment. In FIG. 7, an example of the print image PI to be printed on the sheet M is shown. The print image PI contains a plurality of raster lines (e.g., RL1 to RL3 in FIG. 7), each of which extends in the X direction (i.e., the main scanning direction during printing) and the positions of the plurality of raster lines in the Y direction (i.e., the conveying direction AR during printing) differ from each other. Each raster line is a line in which multiple dots can be formed.

FIG. 7 further illustrates a head position, i.e., the position of the print head 110 relative to the sheet M in the conveying direction. The head positions P11-P16, P21-P23, P31, and P41-P42 are the head positions for the last 12 partial printings executed out of the plurality of partial printings.

A Hatched area of the head position is an area where the nozzles NZ (also referred to "used nozzles") used for printing in the partial printing are located when the partial printing is performed at the head position. The used nozzles are all or part of the available nozzles.

In FIG. 7, each raster line contained in the print image PI is printed by three partial printings (i.e., a so-called multi-pass printing). Three partial printings to print a specific raster line are also referred to as a partial printing set. For example, each raster line in a partial area NAc in FIG. 7 is printed in a partial printing set executed at head positions P11, P12 and P13. Each raster line in a partial area NAm is printed in a partial printing set executed at head positions of P21, P22 and P23.

The reason why each raster line is printed in the multiple partial printings will be explained. Suppose that each raster line is printed by only one partial printing. In this case, due to variations in conveying amount of the sheet M, a so-called banding defect may occur at a boundary between an area in which the printing is performed by one partial printing and an area adjacent, in the conveying direction AR, to an area in which the printing is performed by another partial printing. The banding degrades the image quality of the print image PI. By printing each raster line in the multiple partial printings, the above-mentioned defect called banding can be suppressed. This is because when dots on one raster line are formed in multiple the partial printings, all dots on one raster line can be suppressed to be shifted in the same way with respect to all dots on other raster lines.

Figure 8A:
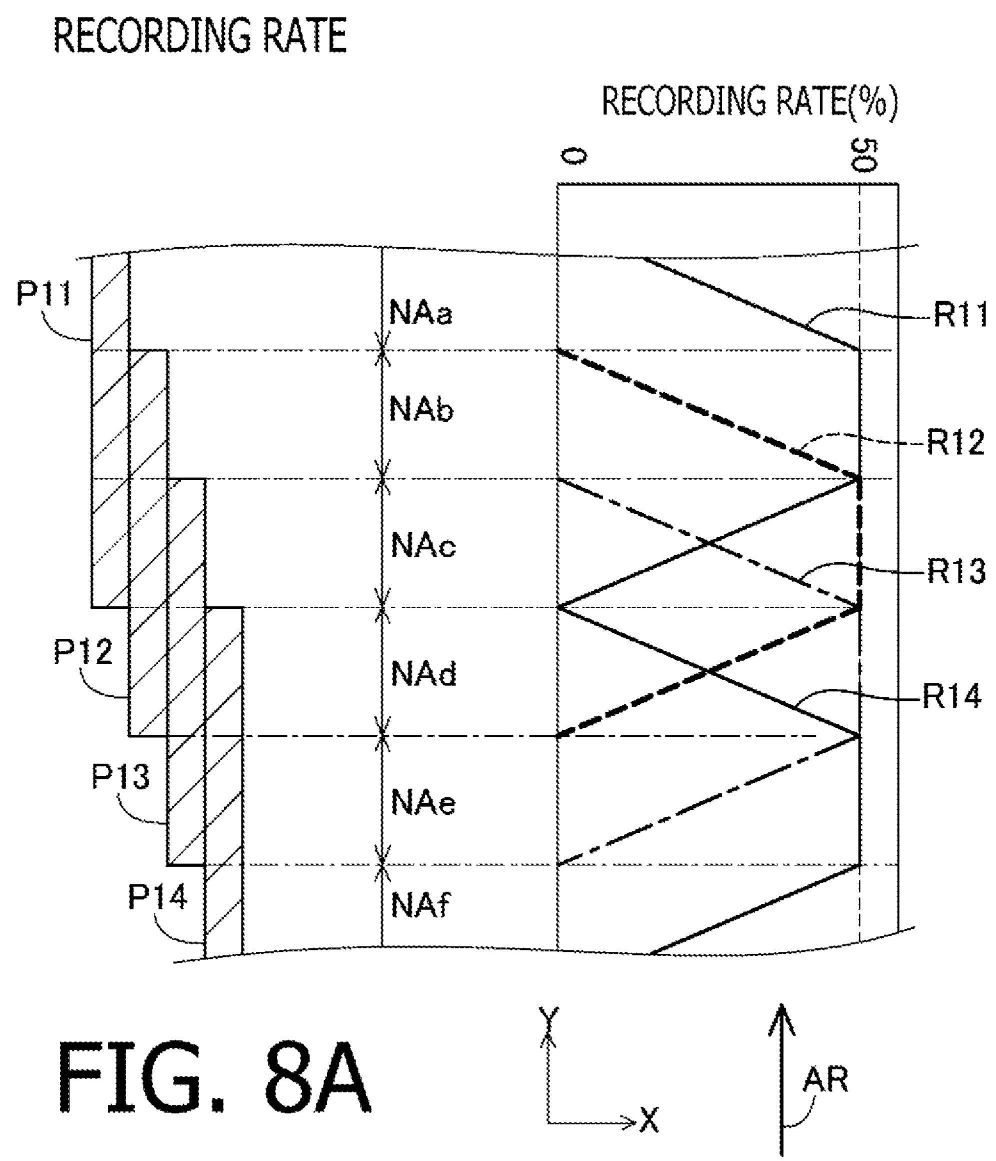
FIGS. 8A and 8B illustrate a recording rate of partial printing.
Figure 8B:
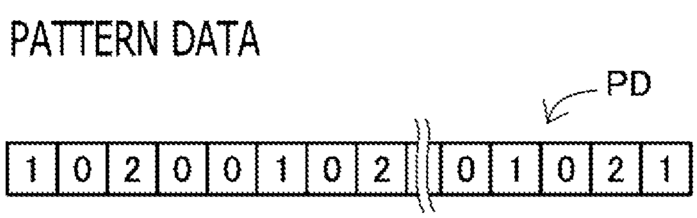

FIGS. 8A and 8B illustrate a recording rate for the partial printing. In FIG. 8A, recording rates R11 to R14 are the recording rates of dots in partial printings performed at head positions P11 to P14, respectively. The partial printing at each head position forms dots in three partial areas which include a downstream area, a central area and an upstream area. The downstream area is an area where dots are also formed in the first and second previous partial printings. The central area is an area where dots are formed in the first previous partial printing and a next partial printing. The upstream area is an area where dots are formed in the first and second next partial printings. For example, when looking at the partial printing at the head position P13, the partial area NAc where dots are formed at the head positions P11 and P12 is the downstream area. The partial area NAd where dots are formed at the head positions P12 and P14 is the downstream area. And The partial area NAe where dots are formed at the head positions P14 and P15 is the upstream area.

Noting the partial printing at the head position P13, in the partial area NAc, which is the downstream area, the recording rate R13 increases linearly in the range of 0%<R13<50% toward the upstream side of the conveying direction AR (i.e., the lower side of FIG. 8A). In the partial area NAd, which is the central region, the recording rate R13 has a constant value (i.e., 50%). In the partial area NAe, which is the upstream area, the recording rate R13 decreases linearly in the range of 0%<R13<50% toward the upstream side of the conveying direction AR (i.e., the lower side of FIG. 8A). In each partial area, the sum of the recording rates of the three partial printings to form dots in that partial area is 100% at all positions in the conveying direction AR. As described above, by changing the recording rates in the upstream area and the downstream area of each partial printing according to the position of the conveying direction AR, appearance of the banding is effectively suppressed.

Figure 9:
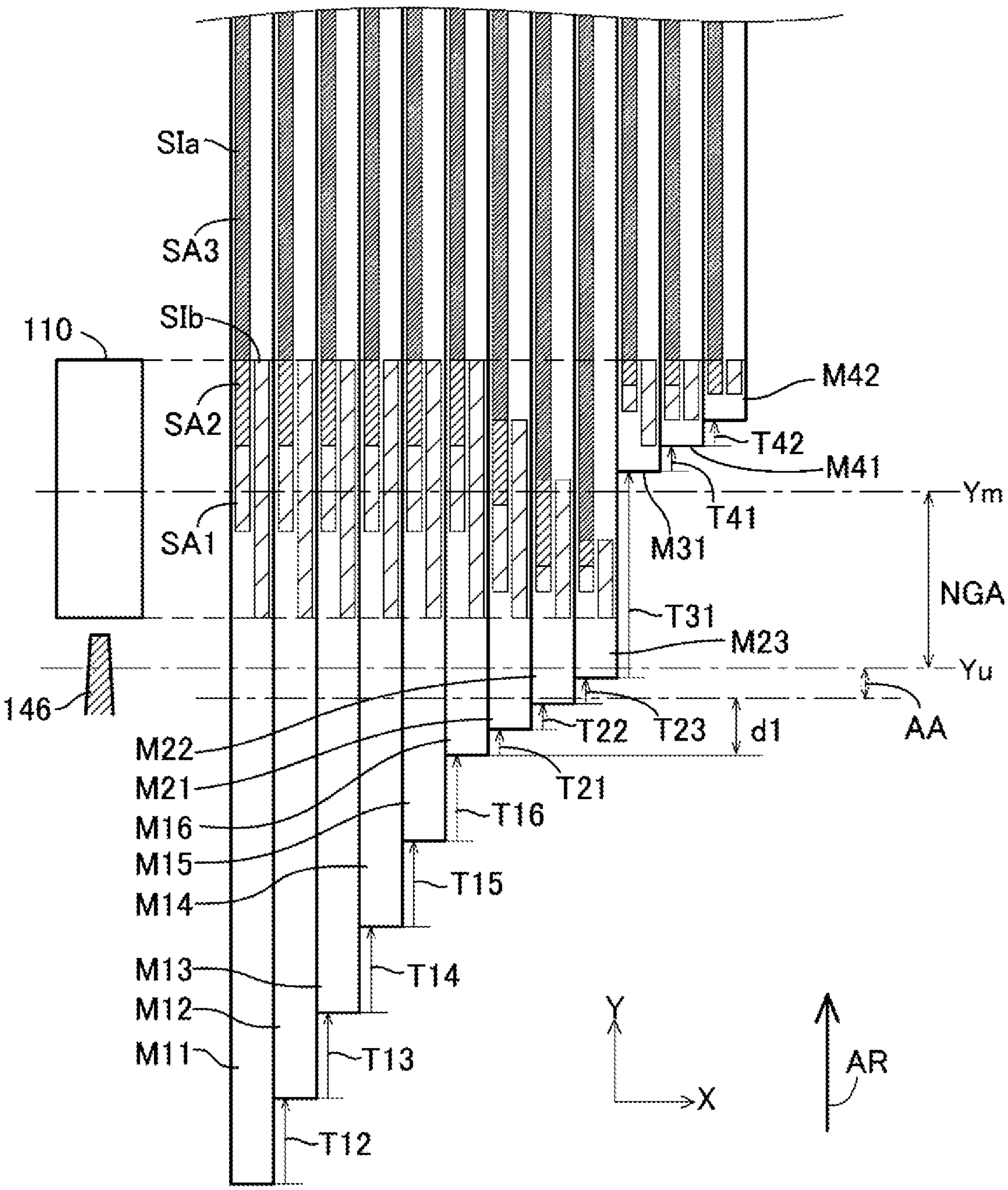
FIG. 9 is a second illustration of the printing according to the first embodiment.

FIG. 9 is a second illustration of printing according to the first embodiment. In FIG. 7, as described above, the sheet M and print image PI are illustrated fixedly, and the position of the print head 110 (i.e., a head position), which moves relative to the sheet M and the print image PI as the sheet M is conveyed, is shown. In contrast, in FIG. 9, the print head 110 and the holding members 146 are illustrated fixedly, and the position of the sheet M (i.e., a sheet position), which moves relative to the print head 110 and the holding members 146 as the sheet M is conveyed, is shown. FIGS. 7 and 9 illustrate the same printing from different perspectives.

In FIG. 9, the sheet positions are indicated by strip-shaped rectangles. The sheet positions M11-M16, M21-M23, M31, and M41-M42 in FIG. 9 correspond to the head positions P11-P16, P21-P23, P31, and P41-P42 in FIG. 7, respectively. In other words, the sheet position Mk (k is a two-digit number) in FIG. 9 indicates the sheet position when the partial printing is performed at the head position Pk in FIG. 7.

In FIGS. 7 and 9, sheet conveyance T12-T16, T21-T23, T31, and T41-T42 are further illustrated with arrows. The sheet conveyance Tk (k is a two-digit number) is the sheet conveyance immediately before the partial printing at the head position Pk in FIG. 7. When the sheet conveyance Tk is completed, the sheet M moves to the sheet position Mk.

In FIG. 9, the images SIa and SIb in the process of printing are indicated by two hatched strips in two rows within the rectangle indicating each sheet position Mk. The first image SIa on the left side is the image that has already been printed in the partial printing prior to the partial printing performed at the sheet position Mk in the print image PI. The first image SIa is hatched with three levels of density. The raster lines in the thinnest hatching area SA1 indicate that one of the three partial printings to print the raster lines has been completed. The raster lines in the intermediate density hatching area SA2 indicate that two of the three partial printings to print the raster lines have been completed. The raster lines in the darkest hatching area SA3 indicate that all three partial printings to print the raster lines have been completed. The second image SIb on the right is the image, which is a part of the print image PI, printed in the partial printing performed at the sheet position Mk.

In the multi-pass printing in which one partial area is printed with three partial printings, as in the present embodiment, a pass configuration has to be set in such a manner that a following condition is satisfied between any one partial printing and the partial printing one cycle after the first partial printing (partial printing three times after the first partial printing in the present embodiment). When this condition is not satisfied, a gap will be generated between the partial image printed in one partial printing and the partial printing one cycle later, making it impossible to print a single continuous image.

The condition is that when a raster line printed by the upstream nozzle used in one partial printing is designated as a raster line A, and a raster line printed by the most downstream nozzle used in a partial printing one cycle later is designated as a raster line B, then the raster line B is adjacent to the upstream side of the raster line A.

To satisfy this condition, the maximum value of the total sheet conveyance for one cycle of sheet conveyance performed from one partial printing to the partial printing after one cycle is the nozzle length D. When the total sheet conveyance is at its maximum value is a case where the most upstream nozzle used in one partial printing is the most upstream nozzle NZu of the print head 110 (FIG. 4), and the most downstream nozzle used in a partial printing after a one cycle is the most downstream nozzle NZd of the print head 110 (FIG. 4).

Noting the partial printing executed at the head position P11, FIG. 7 shows a raster line RLa to be printed by the upstream nozzle NZa that is used in the partial printing executed at the head position P11 and a raster line RLb to be printed by the downstream nozzle NZb that is used in the partial printing executed at the head position P14 after one cycle. The raster line RLb is adjacent to the raster line RLa on the upstream side of the raster line RLa. This relationship is satisfied for all partial printings except for the last three partial printings where there are no partial printings after one cycle.

When one partial area is printed in three partial printings, as in the present example, if a condition that the upstream end of M is not allowed to be located in the prohibited area NGA does not need to be considered, the most efficient pass configuration is to perform printing using all the nozzles NZ for the nozzle length D with the conveying amount of each sheet being ⅓ of the nozzle length D (i.e., D/3) (i.e., a so-called uniform feeding). For this reason, as shown in FIGS. 7 and 9, printing is performed with the uniform feeding in the area away from the upstream end of the sheet M. For example, the amount of sheet conveyance T12 to T16 in FIGS. 7 and 9 is (D/3).

In contrast, printing near the upstream end of the sheet M (the lower end in FIG. 9) is configured in such a manner that the upstream end of the sheet M skips over the prohibited area NGA in one sheet conveyance to prevent partial printing while the upstream end of the sheet M is located in the prohibited area NGA as described above.

In FIG. 9, the prohibited area NGA described above is illustrated. In the example shown in FIG. 9, the sheet conveyance T31 is executed in such a manner that the upstream end of the sheet M moves from a position on the upstream side from the prohibited area NGA to a position on the downstream side from the prohibited area NGA.

When the sheet M is a sheet unwound from the roll body R, the length of the prohibited area NGA in the conveying direction AR becomes longer because the sheet M tends to be deflected, causing smudge of the sheet M due to contact with the print head 110, as described above. For example, in the present embodiment, the length of the prohibited area NGA is longer than D/3 in the conveying direction AR. For this reason, in this embodiment, a different configuration from the uniform feeding is used for the printing in the vicinity of the upstream end of the sheet M (the lower end of FIG. 9) in order to make the conveyance amount in the sheet conveyance T31 longer than D/3.

Concretely, as mentioned above, the total conveyance amount for one cycle must be less than or equal to the nozzle length D. Therefore, in order to increase the amounts of sheet conveyance T31 as much as possible, the amounts of conveyance of the two sheet conveyances T22 and T23 before sheet conveyance T31 and the two sheet conveyances T41 and T42 after sheet conveyance T31 are set to values smaller than D/3. When the sheet conveyances T22 and T23 are made excessively small, the length of the partial area to be printed in subsequent partial printings (e.g., the partial area NAm in FIG. 7) in the conveying direction AR will become excessively small. In such a case, smooth changes in recording rate as shown in FIG. 8 cannot be achieved, which may cause image quality problems such as appearance of the banding.

When the sheet conveyances T22 and T23 are made excessively small, the conveyance accuracy may be deteriorated, which may result in a decrease in the image quality due to a decrease in the conveyance accuracy. For this reason, the amounts of sheet conveyances T22 and T23 are determined to be the minimum value as far as such image quality problems do not occur. The amounts of sheet conveyances T41 and T42 are determined to be the same as the amounts of sheet conveyances T22 and T23. The amounts of sheet conveyances T22, T23, T41, and T42 are defined as a small conveyance amount TVs. As a result, the maximum amount of sheet conveyance T31 can be increased to (D-2×TVs), so the amount of sheet conveyance T31 is set to (D-2×TVs), which is the maximum value that can be set.

It is now defined that the conveyance amount of sheet conveyance T31 is a large conveyance amount TVb, the conveyance amount of the uniform feeding (D/3) is a medium conveyance amount TVm, and the length of the prohibited area NGA in the conveying direction AR is a prohibited area length NGL. The large conveyance amount TVb is larger than the medium conveyance amount TVm, and the small conveyance amount TVs is smaller than the medium conveyance amount TVm (i.e., TVs<TVm<TVb). It is also assumed that the large conveyance amount TVb is larger than the prohibited area length NGL, and the medium conveyance amount TVm is smaller than the prohibited area length NGL (i.e., TVm<NGL<TVb).

In order for the upstream end of the sheet M to skip over the prohibited area NGA by the sheet conveyance T31 at the large conveyance TVb, the upstream end of the sheet M must be located within the allowable area AA adjacent to the prohibited area NGA at the upstream side thereof when the sheet M is located at the position (the sheet position M23 in the example in FIG. 9) at the start of the sheet conveyance T31. The length of the allowable area AA in the conveying direction AR (hereinafter, referred to as the allowed range length AL) is a difference between the large conveyance amount TVb and the prohibited area length NGL (TVb–

NGL). It is because, when the upstream end of the sheet M at the start of sheet conveyance T31 is located at the upstream side of the allowable area AA, the upstream end of the sheet M is located within the prohibited area (NGA) after the sheet conveyance T31 is completed. It is also because, when the upstream end of the sheet M at the start of sheet conveyance T31 is located at the downstream side of the allowable area AA, the upstream end of the sheet M is located within the prohibited area (prohibition range) NGA at the start of the sheet conveyance T31.

It is noted that the sheet position M16 after the last sheet conveyance T16 (FIG. 9) at the medium conveyance TVm, the position of the upstream end of the sheet M varies due to the downstream margin of the print image PI and the length of the sheet M in the conveying direction AR. Furthermore, when there is a blank area in the middle, in the conveying direction AR, of the print image PI, and printing is performed skipping the blank area, the position of the upstream end of the sheet M at the sheet position M16 will vary according to the blank area in the print image PI. For this reason, in the present embodiment, the number of sheet conveyances at the smallest conveyance amount TVs performed before the conveyance T31 is adjusted in such a manner that the upstream end of the sheet M is located within the allowable area AA at the start of sheet conveyance T31. In the example in FIG. 9, the three sheet conveyances T21 to T23 are executed with the small conveyance amount TVs.

Figure 10:
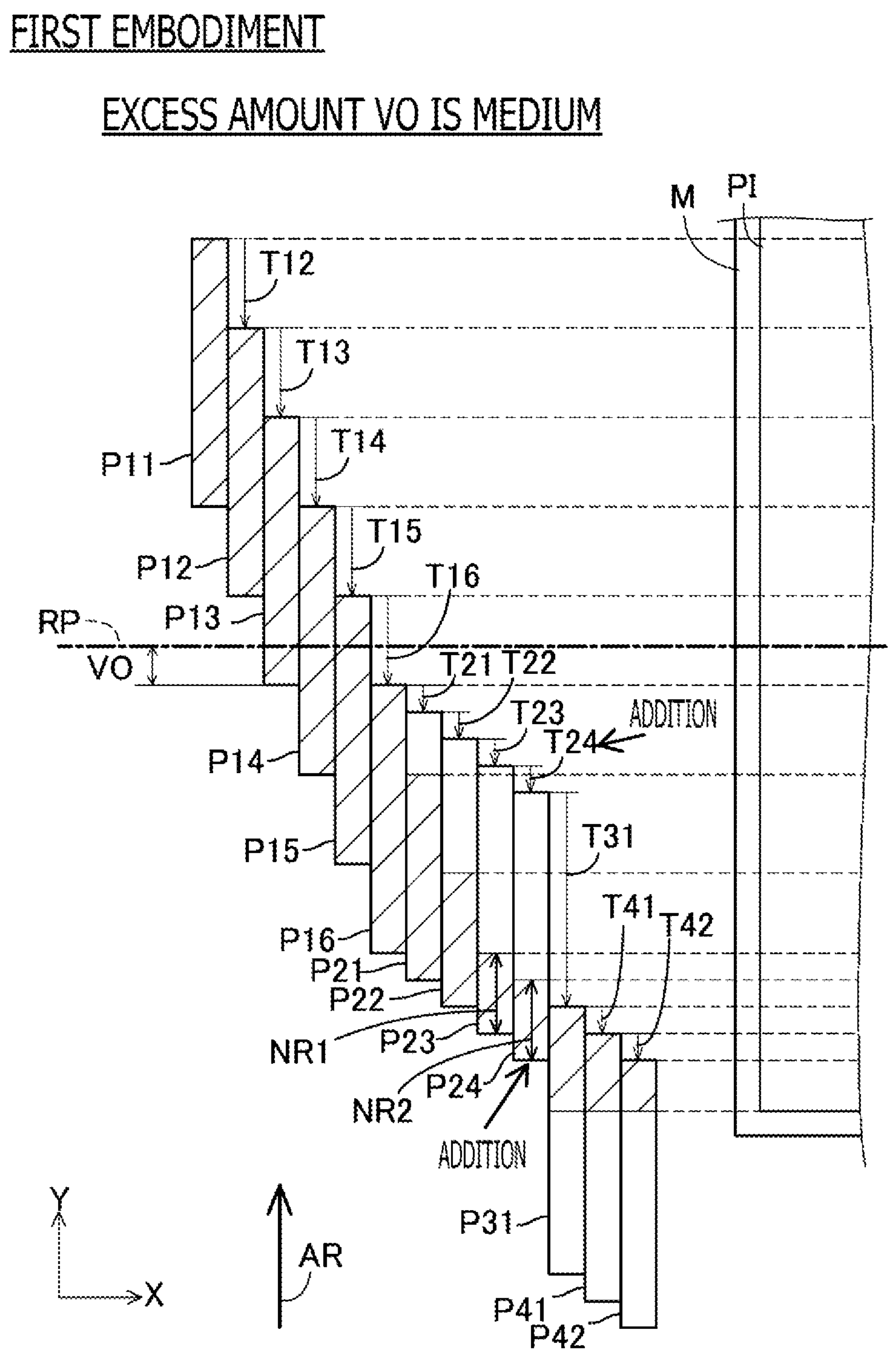
FIG. 10 is a third illustration of the printing according to the first embodiment.
Figure 11:
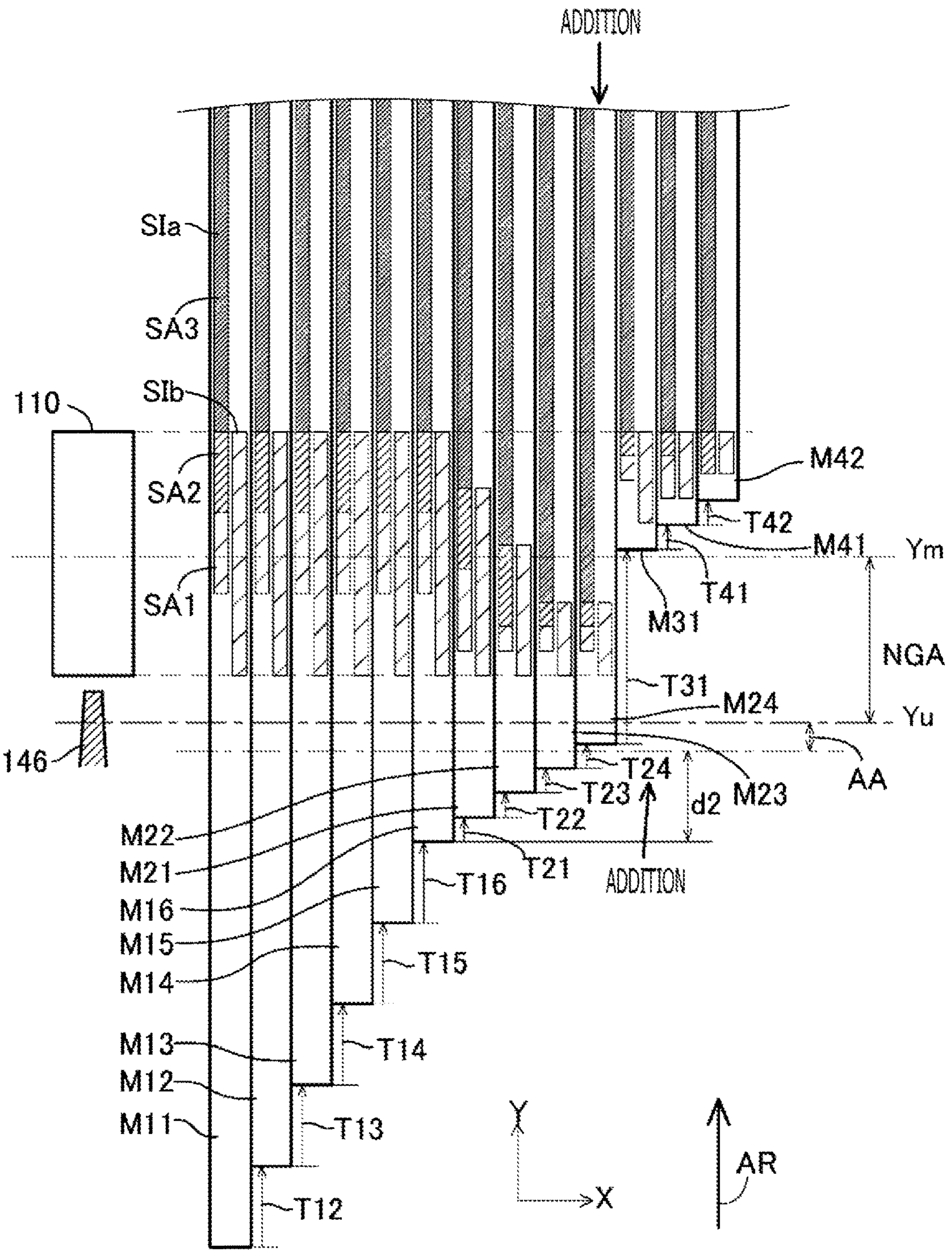
FIG. 11 is a fourth illustration of the printing according to the first embodiment.

FIG. 10 is a third illustration of the printing according to the first embodiment. FIG. 10 shows a position of the print head 110 relative to the sheet M, as in FIG. 7. FIG. 11 is a fourth illustration of the printing according to the first embodiment. In FIG. 11, as in FIG. 9, the sheet positions are indicated relative to the print head 110 and the holding members 146. FIGS. 10 and 11 illustrate the same printings as each other and FIGS. 7 and 9 illustrate printings that are different from each other. In the examples in FIGS. 7 and 9, at the sheet position M16 after the sheet conveyance T16, the upstream end of the sheet M is separated from the allowable area AA by a distance d1 on the upstream side. In contrast, in the examples in FIGS. 10 and 11, at the sheet position M16 after sheet conveyance T16, the upstream end of the sheet M is away from the allowable area AA on the upstream side by a distance d2. The distance d2 is larger than the distance d1.

Therefore, in the examples in FIGS. 10 and 11, in addition to the pass configurations in FIGS. 7 and 9, a sheet conveyance T24 performed at a small conveyance amount TVs, and a partial printing performed after the sheet conveyance T24 at the head position of P24 are added. That is, in the examples in FIGS. 10 and 11, the four sheet conveyances T21 to T24 performed before the sheet conveyance T31 are performed at the small conveyance amount TVs. In this way, even in the examples in FIG. 10 and FIG. 11, at the sheet position when starting the sheet conveyance T31 at the large conveyance TVb (i.e., the sheet position M24 in FIG. 11), the upstream end of the sheet M is located within the allowable area AA. As a result, in the examples in FIGS. 10 and 11, as in FIGS. 7 and 9, the sheet conveyance T31 causes the upstream end of the sheet M to skip over the prohibited area NGA.

Figure 12:
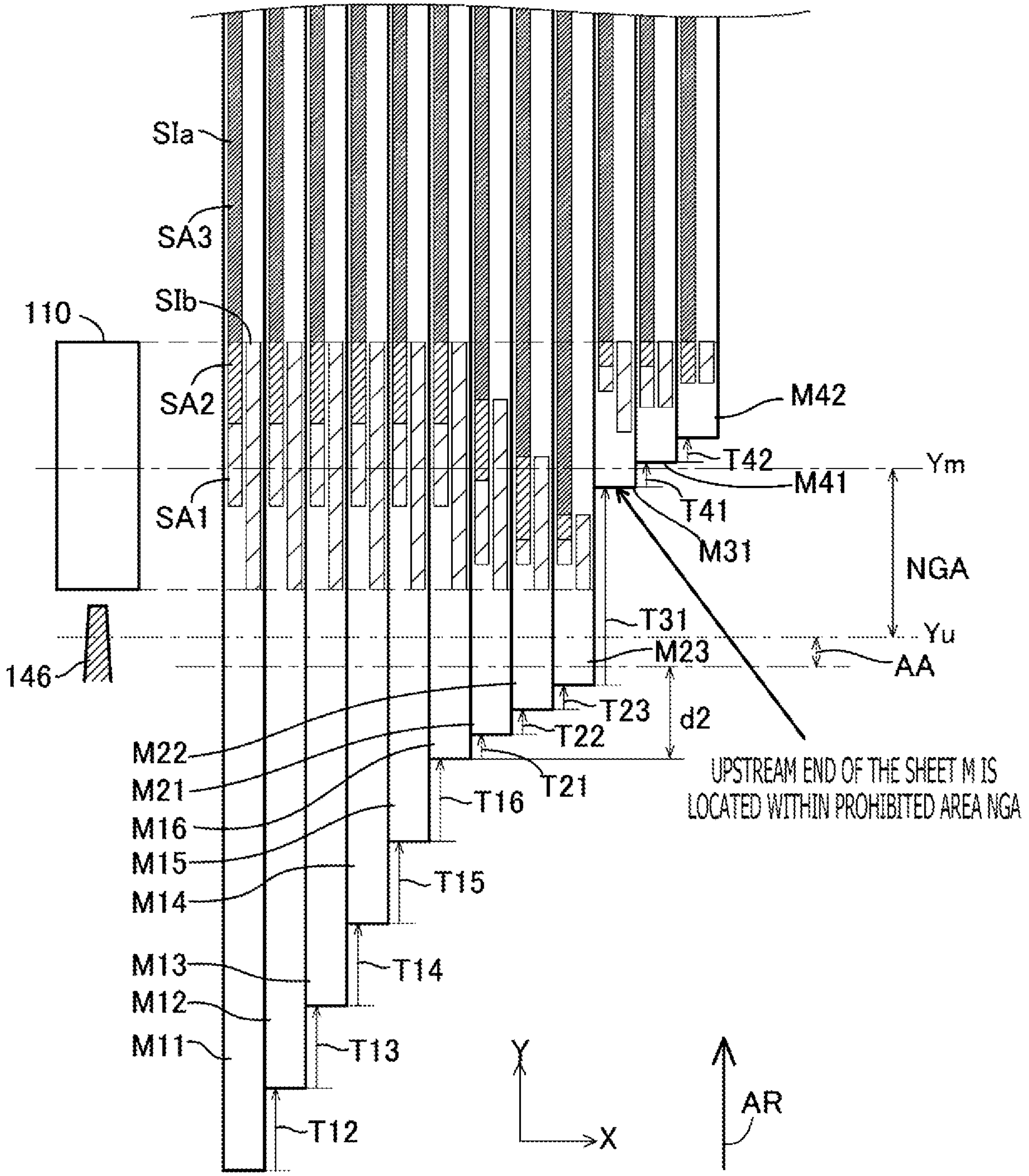
FIG. 12 is an illustration of printing according to a comparative example.

FIG. 12 illustrates the printing according to a comparative example with respect to the fits embodiment. Similar to FIG. 11, FIG. 12 illustrates the sheet positions relative to the print head 110 and the holding members 146. In this comparative example, as in FIGS. 10 and 11, at the sheet position M16 after sheet conveyance T16, the upstream end of the sheet M is separated from the allowable area AA on the upstream side by a distance d2. However, unlike the examples in FIGS. 10 and 11, in the comparative example, the sheet conveyance performed at the small conveyance amount TVs is not added. That is, in the comparative example, the sheet conveyances T21-T23 at small conveyance amount TVs executed before the sheet conveyance T31 are executed three times, as in the examples in FIGS. 7 and 9. For this reason, in the comparative example, the sheet position T31 at the start of sheet conveyance at the large conveyance amount TVb (i.e., the sheet position M23 in FIG. 12), the upstream end of the sheet M is located at a point upstream of the allowable area AA in FIG. 12, paper position M23), the upstream end of the sheet M is located on the upstream side with respect to the allowable area AA. As a result, the upstream end of the sheet M cannot skip over the prohibited area NG by the sheet conveyance T31, and the upstream end of the sheet M is located within the prohibited area NGA at the sheet position M31 after the sheet conveyance T31. For this reason, in the comparative example (FIG. 12), compared to the present embodiment (FIGS. 10 and 11), the smudge of the sheet M occurs easily.

Figure 13:
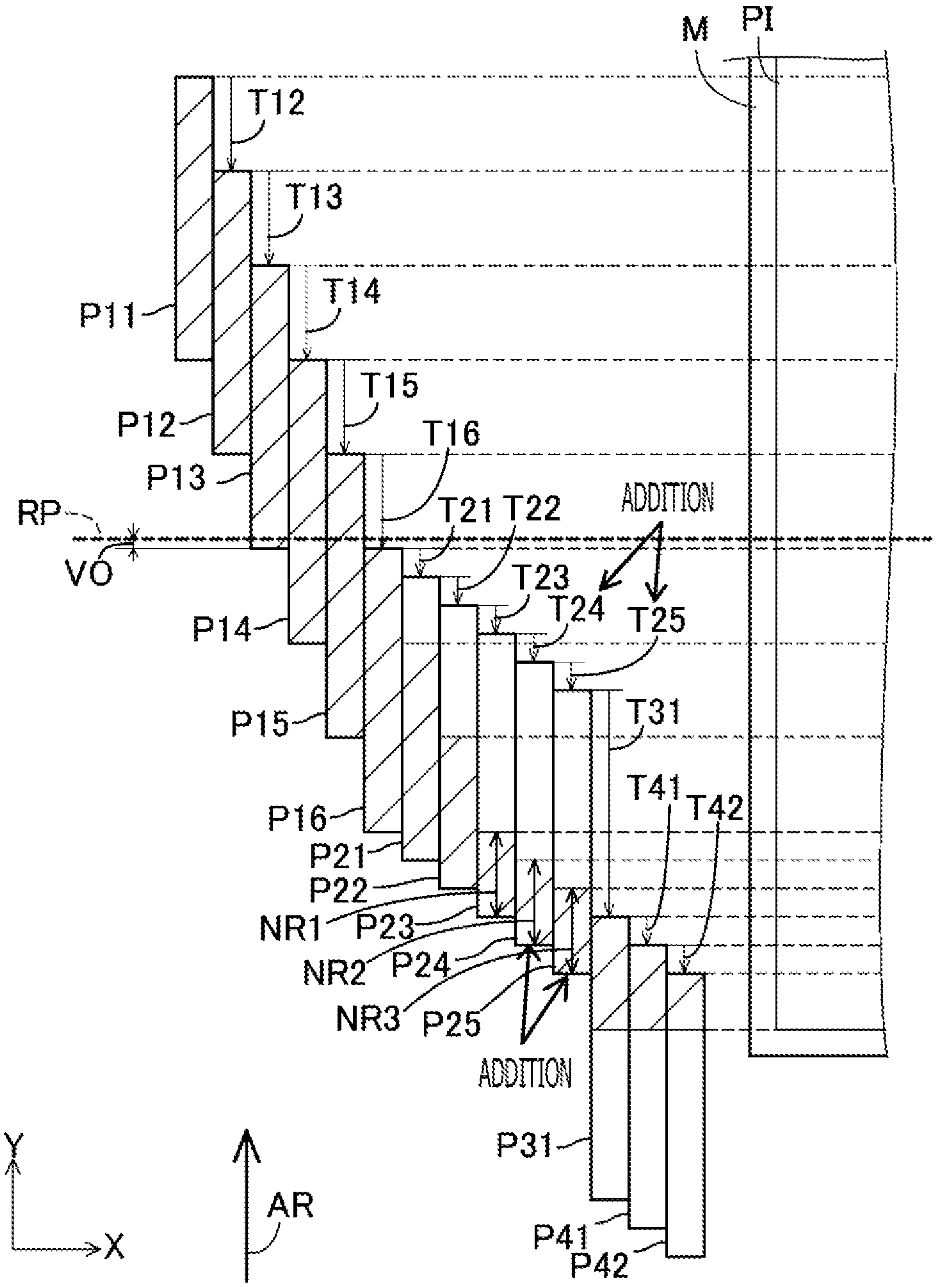
FIG. 13 is a fifth illustration of the printing according to the first embodiment.
Figure 14:
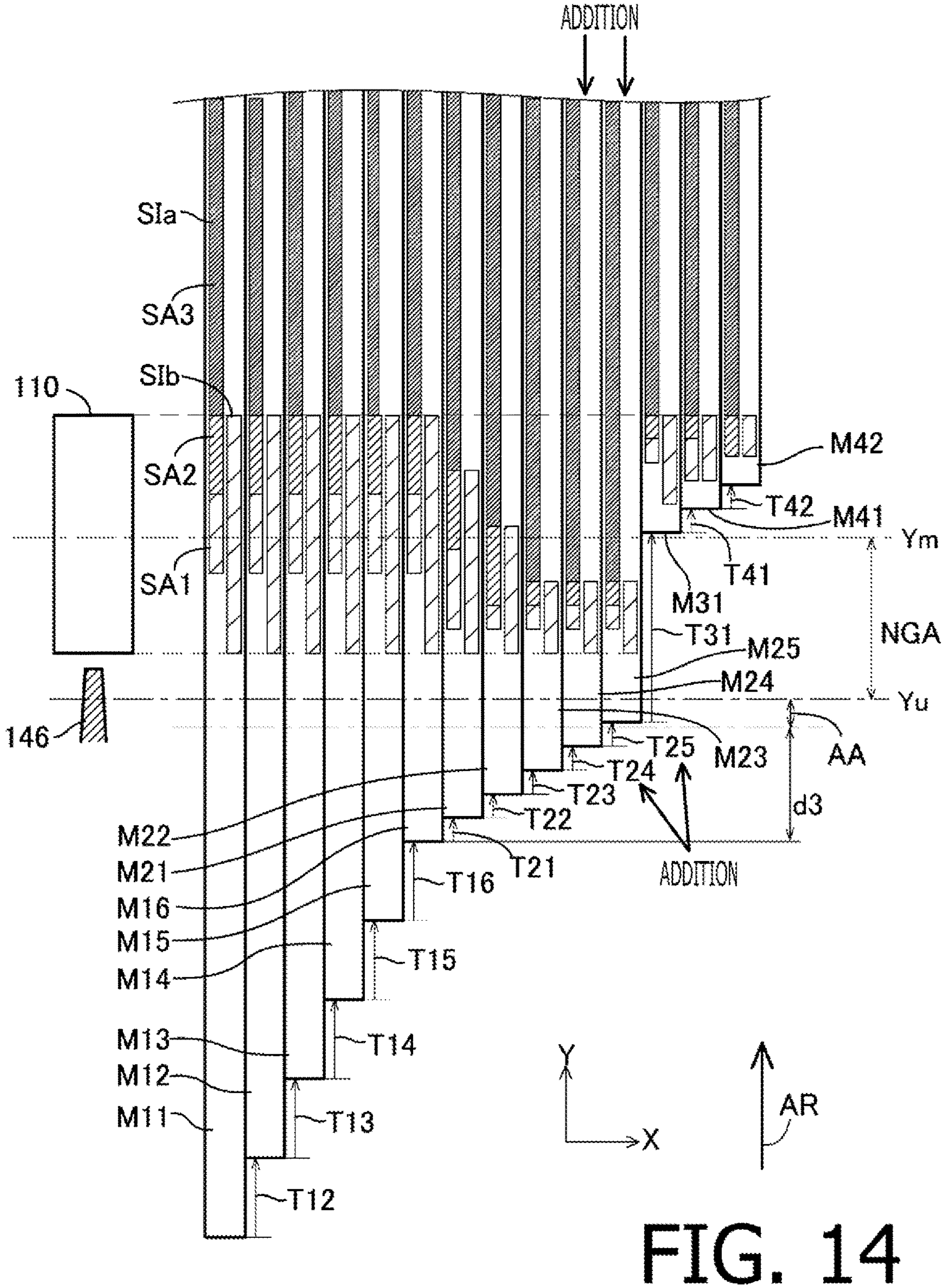
FIG. 14 is a sixth illustration of the printing according to the first embodiment.

FIG. 13 is a fifth illustration of the first embodiment. Similar to FIG. 7, in FIG. 13, the position of the print head 110 relative to the sheet M is indicated. FIG. 14 is a sixth illustration of the first embodiment. In FIG. 14, similar to FIG. 9, a sheet position relative to the print head 110 and the holding members 146 is indicated. FIG. 13 and FIG. 14 illustrates the same printing, while the FIG. 7 and FIG. 9, and FIG. 10 and FIG. 11 illustrate different printings, respectively. In the example shown in FIGS. 13 and 14, at the sheet position M16 after the sheet conveyance T16, the upstream end of the sheet M is separated from the allowable area AA by a distance d3 on the upstream side. The distance d3 is larger than the distance d1 (see FIG. 9) and the distance d2 (see FIG. 11). Therefore, in the example shown in FIGS. 13 and 14, a sheet conveyance T24 performed with the small conveyance amount TVs and the partial printing performed at the head position of P24 after the sheet conveyance T24, and a sheet conveyance T25 performed with the small conveyance amount TVs and the partial printing performed at the head position P25 after the sheet conveyance T25 are added in addition to the pass configurations shown in FIGS. 7 and 9.

Thus, in the examples shown in FIGS. 13 and 14, the five sheet conveyances T21 to T25, which are executed before sheet conveyance T31, are executed at the small conveyance rate of TVs. In this way, even in the examples in FIGS. 13 and 14, at the sheet position (i.e., the sheet position M24 in FIG. 4) at the start of the sheet conveyance T31 at the large conveyance amount TVb, the upstream end of the sheet M is located within the allowable area AA. As a result, in the examples of FIGS. 13 and 14, as in the examples of FIGS. 7, 9, 10 and 11, the sheet conveyance T31 causes the upstream end of the sheet to skip over the prohibited area NGA. If the sheet conveyances T24 and T25 at the small conveyance amount TVs are not added, the upstream end of the sheet M cannot skip over the prohibited area NGA by the sheet conveyance T31.

A-3. Print Data Outputting Process

Figure 15A:
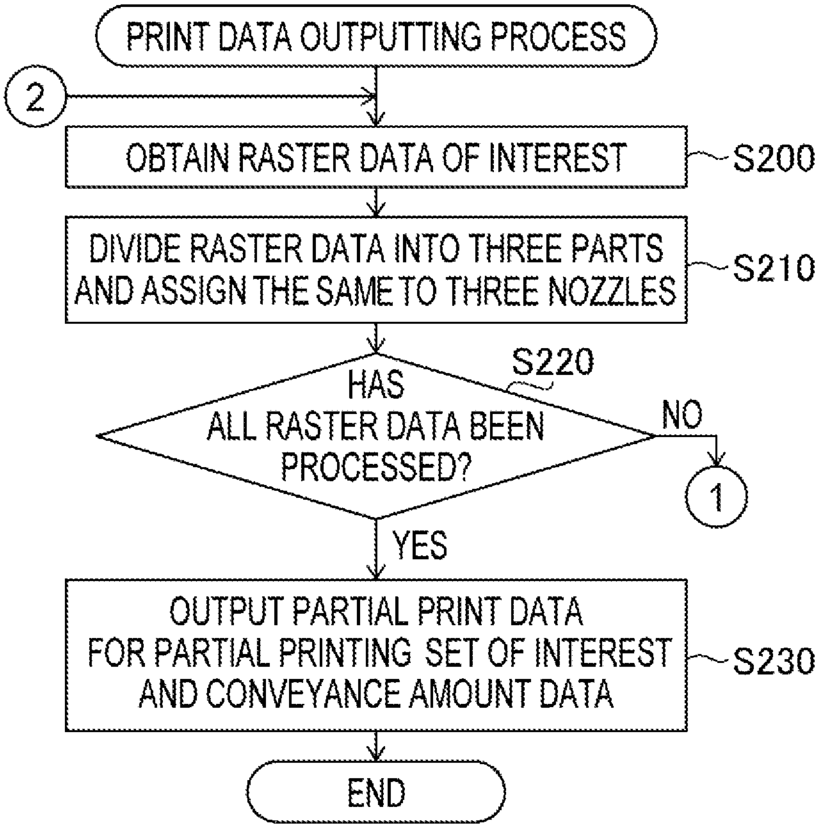
FIGS. 15A and 15B are a flowchart illustrating a print data outputting process.
Figure 15B:
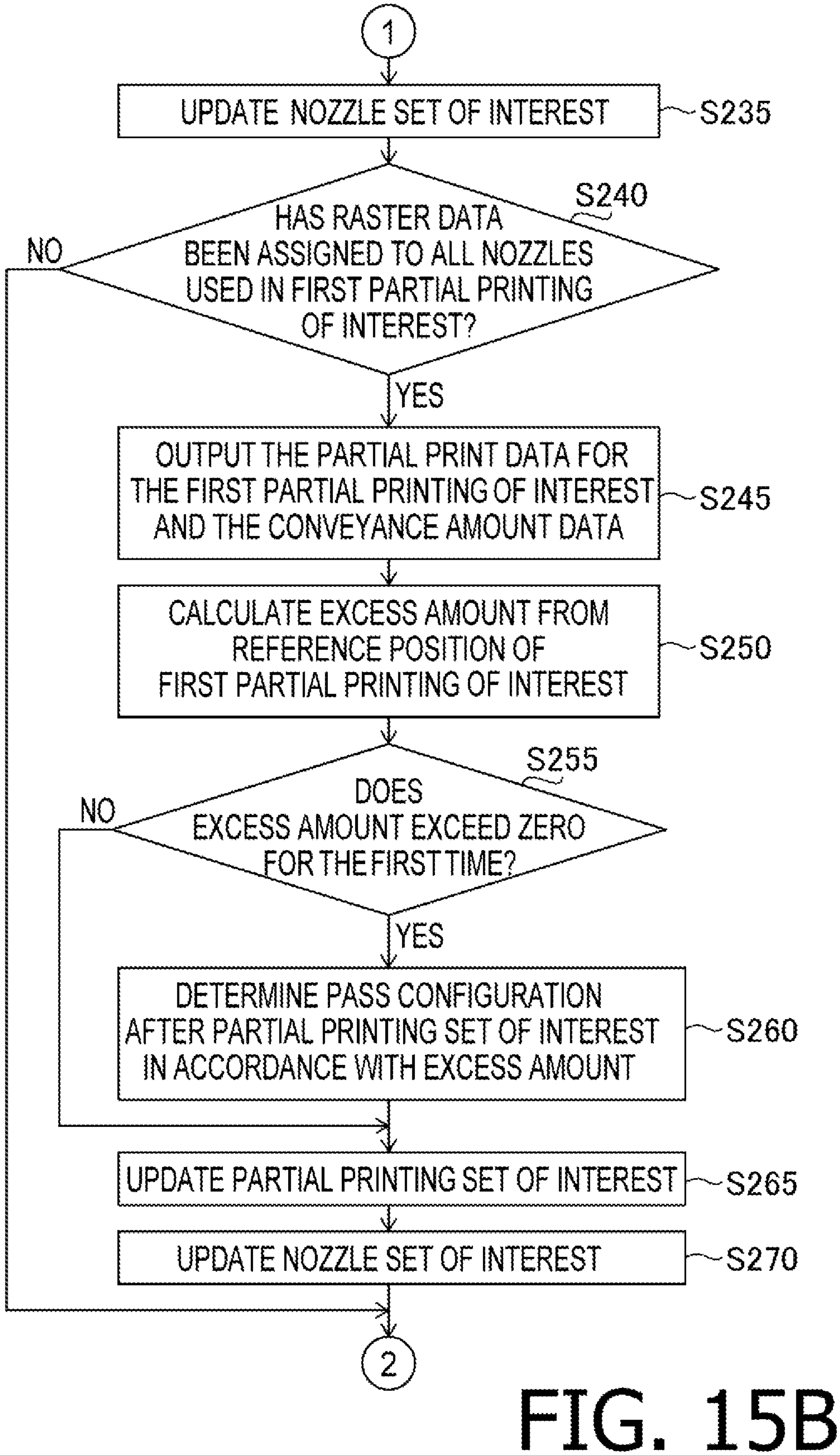

Next, a print data outputting process for a normal print mode (S140 of FIG. 6) will be described. The print data outputting process is, as mentioned above, a process of generating partial print data for each partial printing using the print data generated in S130 and outputting the partial print data to which the various control data has been added to the printing mechanism 100. FIGS. 15A and 15B are a flowchart illustrating the print data outputting process.

The print data generated at S130 in FIG. 6 represents the print image PI to be printed (FIG. 7). Therefore, the print data contains multiple raster data corresponding to multiple raster lines included in the print image PI.

In S200, the CPU 210 obtains raster data corresponding to one raster line of interest (hereinafter also referred to as the raster data of interest) from among the multiple raster data. The raster line of interest is included in the print image PI and is selected from a plurality of raster lines arranged in the conveying direction AR, one by one in sequence from the downstream side (i.e., +Y side in FIG. 7) of the conveying direction AR at the time of printing.

Hereinafter, the three partial printings that print the raster lines of interest are also referred to as a partial printing set of interest. For example, when the raster line RL2 in FIG. 7 is the raster line of interest, the partial printing set of interest is three partial printings performed at head positions P1 1, P12 and P13. Three nozzles NZ used, in the partial printing set of interest, for forming dots on the raster line of interest will also be referred to as a nozzle set of interest. For example, when the raster line RL2 shown in FIG. 7 is the raster line of interest, the nozzle set of interest includes three nozzles which are a nozzle NZ forming a dot on the raster line RL2 at the head position of P11, a nozzle NZ forming a dot on the raster line RL2 at the head position of P12, and a nozzle NZ forming a dot on the raster line RL2 at the head position of P13.

In S210, the CPU 210 divides the raster data of interest into three parts and assigns the same to the three nozzles NZ constituting the nozzle set of interest, respectively.

Concretely, the CPU 210 obtains divided pattern data PD corresponding to the raster line of interest. In FIG. 8B, an example of the divided pattern data PD is shown. As shown in FIG. 8B, the divided pattern data PD is data having values corresponding to respective pixels of the raster line of interest. The value corresponding to each pixel has one of values "0," "1," and "2." The value "0" indicates that the dot corresponding to the pixel should be formed in the first partial printing of the partial printing set of interest. The value "1" indicates that the dot corresponding to that pixel should be formed in the second partial printing of the partial printing set of interest. The value "2" indicates that the dot corresponding to that pixel should be formed in the third partial printing of the partial printing set of interest.

The divided pattern data PD is generated in such a manner that the recording rate in FIG. 8A above is realized according to the position on the raster line of interest in the conveying direction AR. The CPU 210 divides the raster data of interest into three pieces of data for partial printings that constitute the partial printing set of interest according to the divided pattern data PD. The CPU 210 assigns the three divided data to the three nozzles NZ that constitute the nozzle set of interest, respectively. A memory area is reserved in the buffer area 231 of the volatile storage 230 to store the print data for the nozzle set of interest (i.e., for three partial printings), and the three pieces of data assigned to the three nozzles NZ are stored at respective addresses corresponding to the three nozzles NZ in the memory area.

In S220, the CPU 210 determines whether all the raster data has been processed. When the raster data of interest represents the most upstream raster line of the print image PI, in the example in FIG. 7, the raster line RL3, it is determined that all the raster lines have been processed (S220: YES). When the raster data of interest does not represent the most upstream raster line of the print image PI, it is determined that there remain unprocessed raster lines (S220: NO).

When it is determined that all the raster lines have been processed (S220: YES), the CPU 210 advances the process to S230, while when it is determined that there remain unprocessed raster lines (S220: NO), the CPU 210 advances the process to S235.

In S230, the CPU 210 outputs the partial print data for the partial printing set of interest and the conveyance amount data to the printing mechanism 100 to complete the print data outputting process. In other words, the partial print data for the last three partial printings and the conveyance amount data representing the amount of sheet conveyance to be performed immediately before each of the three partial printings are output to the printing mechanism 100. In the example shown in FIG. 7, the partial print data for the three partial printings performed at head positions P31, P41 and P42, and the conveyance amount data indicating the respective conveyance amounts of sheet conveyances T31, T41 and T42 are output.

When the printing mechanism 100 receives the partial print data for three partial printings and the conveyance amount data for three sheet conveyances, the printing mechanism 100 completes printing by executing the three sheet conveyances and the last three partial printings respectively executed after the three sheet conveyances in accordance with these data.

In S235, the CPU 210 updates the nozzle set of interest. Concretely, the number indicating each of the three nozzles NZ that constitute the nozzle set of interest is changed to a number indicating the nozzle that is only one nozzle upstream from the current nozzle.

In S240, the CPU 210 determines whether the raster data has been assigned to all the nozzles used in the first partial printing of interest. The first partial printing of interest is the first partial printing in the partial printing set of interest. Concretely, it is judged that the raster data has been assigned to all the nozzles in use when the numbers indicating the nozzles in the updated nozzle set of interest, which indicate the nozzles of the first partial printing of interest, exceed the number of the most upstream nozzle of the nozzles in use. When there is a nozzle in use to which raster data has not been assigned (S240: NO), the process returns to S200.

When the raster data has been assigned to all the nozzles in use (S240: YES), in S245, the CPU 210 outputs the partial print data for the first partial printing of interest and the conveyance amount data, to the printing mechanism (printing mechanism) 100. The partial print data is a group of raster data assigned to the nozzles used for the first partial printing of interest. The conveyance amount data is control data that represents the amount of sheet conveyance to be performed immediately before the first partial printing of interest. Before S260, described later, is executed, the conveyance amount is the medium conveyance amount TVm, which is the conveyance amount of the uniform feeding. After S260 is executed, the conveyance amount is the conveyance amount determined in S260 (i.e., the medium conveyance amount TVm, the small conveyance amount TVs, or the large conveyance amount TVb).

When receiving the partial print data and the conveyance amount data, the printing mechanism 100 executes the sheet conveyance by the conveyance amount indicated by the conveyance amount data, and then executes the first partial printing using the partial print data.

In S250, the CPU 210 calculates an excess amount VO from a reference position RP of the first partial printing of interest. The excess amount VO indicates a length from the reference position RP to the most upstream nozzle NZ when the most upstream nozzle NZ of the first partial printing nozzle of interest is located on the upstream side from the reference position RP. The reference position RP (see FIG. 7) is a position defined, along the conveying direction AR, on the sheet M. The reference position RP is defined at a particular distance from the upstream end of the sheet M. Since the upstream end of the sheet M is an end at which the sheet M is cut by the sheet cutter 150 under the control of the CPU 210, the CPU 210 recognizes positional relationships between the upstream end of the sheet M and the nozzles NZ of the print head 110. Thus, since the CPU 210 can recognize positional relationships between the reference position RP and the nozzles NZ of the print head 110, the CPU 210 can calculate the excess amount VO.

In the example shown in FIG. 7, when the partial printing performed at the head position of P13 is the first partial printing of interest, since the most upstream nozzle NZ of the partial printing performed at the head position of P13 is located at the upstream side from the reference position RP, the excess amount VO as shown in FIG. 7 is calculated. A unit of the excess amount VO is, for example, the number of the raster lines.

When the most upstream nozzle NZ is located at the same position of the reference position RP or on the downstream side from the reference position RP, the excess amount VO is zero. In the example shown in FIG. 7, when the partial printing performed at the head positions of P11 and P12 is the first partial printing of interest, the most upstream nozzles NZ of the partial printings are located at the downstream side from the reference position RP and the excess amounts VO are zero.

In S255, the CPU 210 determines whether the excess amount VO calculated in S250 exceeds zero for the first time. In the example shown in FIG. 7, when the partial printing performed at the head position of P13 is the first partial printing of interest, it is determined that the excess amount VO exceeds zero for the first time.

When it is determined that the excess amount VO exceeds zero for the first time (S255: YES), the CPU 210 determines, in S260, a pass configuration after the current partial printing set of interest in accordance with the excess amount VO. The excess amount VO exceeding zero for the first time means that the printing proceeds in the vicinity of the upstream end of the sheet M. In order to realize the pass configuration referring to FIG. 7, FIG. 9 and the like, the pass configuration must be changed from a configuration in which the uniform feeding with the medium conveyance amount TVm is performed to a configuration including feedings at the large conveyance amount TVb or the small conveyance amount TVs (see FIGS. 7 and 9). Therefore, when it is determined that the excess amount exceeds zero for the first time, the pass configuration after the current partial printing set of interest is determined to be a configuration including the sheet conveyance at the large conveyance amount TVb or the small conveyance amount TVs.

As shown in FIG. 7, the partial printing set of interest when the excess amount VO exceeds zero for the first time includes three partial printings performed at the head positions of P13, P14 and P15. Thus, the pass configuration (e.g., a conveyance amount for each sheet conveyance, a range of the nozzle in use and the like) after the partial printing at the head position of P15 is determined. Concretely, the sheet conveyance after the partial printing at the head position of P15 is determined to include one sheet conveyance T16 at the medium conveyance amount TVm, three to five sheet conveyances (e.g. the sheet conveyances T21-T23 in the example shown in FIG. 7) at the small conveyance amount TVs, one sheet conveyance T31 at the large conveyance amount TVb and two sheet conveyances T41 and T31 at the small conveyance amount TVs. Then, in accordance with the thus determined sheet conveyances, a usage range of the nozzles to be used in each partial printing after each sheet conveyance (e.g., a hatched portion in FIG. 7) is determined.

The excess amount VO varies depending on the sheet position relative to the print head 110. Concretely, the excess amount VO varies within a range of equal to or greater than zero and equal to or less than the medium conveyance amount TVm (i.e., D/3). The smaller the excess amount VO, the greater the distance between the print head 110 and the upstream end of the sheet M. Therefore, the smaller the excess amount VO, the greater the distance between the sheet position M16 after the sheet conveyance T16 and the allowable area AA (e.g., the distance d1 in FIG. 9, the distance d2 in FIG. 11, and the distance d3 in FIG. 14). In the examples in FIGS. 7 and 9, the excess VO is large and close to the medium conveyance amount TVm. In the examples in FIGS. 10 and 11, the excess amount VO is smaller than those in FIGS. 7 and 9, and the excess amount VO is about half of the medium conveyance amount TVm. In the examples in FIGS. 13 and 14, the excess amount VO is smaller than those in FIGS. 10 and 11, and the excess amount VO is close to zero. For this reason, as described above, the distance d2 in the examples in FIGS. 10 and 11 is larger than the distance d1 in the examples in FIGS. 7 and 9, and the distance d3 in the example in FIGS. 13 and 14 is larger than the distance d2 in the example in FIGS. 10 and 11 (i.e., d3>d2>d1).

In the present embodiment, the smaller the excess amount VO, the more the number of sheet conveyances at the small conveyance amount TVs which are performed before the sheet conveyance T13 at the large conveyance amount TVb. Concretely, in the present embodiment, the number of the sheet conveyances at the small conveyance amount TVs performed before the sheet conveyance T31 is three, which is set as the standard number of times. The number of additions Nad is then determined by the following equation (1).

$$Nad = \text{rounddown}[(TVm - VO)/TVs] \quad (1)$$

where, rounddown [A] represents an integer rounded down to the nearest decimal point of the number A.

Accordingly, in the examples in FIGS. 7 and 9, the number of sheet conveyances at the small conveyance TVs before the sheet conveyance T31 is determined to be three (i.e., the sheet conveyances T21-T23). In the example in FIGS. 10 and 11, the number of sheet conveyances at the small conveyance amount TVs before the sheet conveyance T31 is determined to be four (i.e., the sheet conveyances T21-T24). In the example in FIGS. 13 and 14, the number of sheet conveyances at the small conveyance amount TVs before the sheet conveyance T31 is determined to be five (i.e., the sheet conveyances T21-T25). In this way, as a result of the determination of the pass configuration, at the sheet position when the sheet conveyance T31 starts, the number of times of sheet conveyances at the small conveyance amount TVs is adjusted in such a manner that the upstream end of the sheet M is positioned within the allowable area AA.

When it is determined that the excess amount VO does not exceed 0 (S255: NO), and when the excess amount VO has already exceeded 0 when the partial printing prior to the current first partial printing of interest was the first partial printing of interest (S255: NO), the CPU 210 skips S260 and proceeds to S265.

In S265, the CPU 210 updates the partial printing set of interest. That is, the second partial printing of the three partial printings that constitute the current partial printing set of interest is set to the first partial printing of the new partial printing set of interest (the first partial printing of interest described above). The third partial printing of the three partial printings that constitute the current partial printing set of interest is set to the second partial printing of the new partial printing set of interest. The next partial printing to be executed after the three partial printings that constitute the current partial printing set of interest is set to the third partial printing of the new partial printing set of interest. For example, when the current partial printing set of interest is the three partial printings performed at head positions of P11, P12 and P13 in FIG. 7, a new partial printing set of interest includes the three partial printings at the head positions of P12, P13 and P14.

In S270, the CPU 210 updates the nozzle set of interest. In other words, the three nozzles that constitute the nozzle set of interest are set to the nozzles corresponding to the new partial printing set of interest. The third partial printing nozzle added to the new partial printing set of interest is set to the initial nozzle at this point. The initial value is a value corresponding to the most downstream nozzle NZd before S260 is executed, and after S260 is executed, the initial value is the value according to the path configuration determined in S260. After S270, the CPU 210 returns the process to S200.

According to the first embodiment described above, the printer 200 includes the housing 1, the print head 110 provided inside the housing 1, and the roll mount in which the roll body R is removably mounted (FIG. 2). The roll body R is the sheet M, which is a sheet-type printing media, wound around as a roll (FIG. 2). The printer 200 further includes the conveyor 140 (FIG. 2), configured to convey the sheet M in the conveying direction along the conveying path including an upstream path TR from the roll mount 11 to the print head 110, and the cutter 151 configured to cut the sheet M at the particular position Cp in the upstream path TR (FIG. 2). The conveyor 140 includes a holder (i.e., the high support members HP and the holding members 146 in the present embodiment) arranged between the cutter 151 and the print head 110 (see FIGS. 3 and 5). This holder is configured to hold the sheet M in a corrugated deformation along a direction perpendicular to the conveying direction (FIG. 5B).

According to this configuration, since the cutter 151 cuts the sheet M at a particular position in the upstream path from the roll mount 11 to the print head 110, the length from the roll mount 11 to the cutting position is relatively short. Therefore, the amount of re-winding of the roll body R can be reduced. To explain in more detail, for example, when the roll body R is removed from the housing 1 with the sheet feeding tray 5, the tip of the sheet M that is unwound from the roll body R and cut by the cutter 151 is bent when it contacts the housing 1 or other parts of the housing. To prevent such a situation, the unwound portion of the sheet M in question is re-wound prior to removal. In this case, the present embodiment can reduce the amount of re-winding of the roll body R and the time required for re-winding. In turn, a user's waiting time (a time spent waiting without removing the roll body until the re-winding is completed) can be reduced.

Further, in the above embodiment, the CPU 210 is configured to cause the printing mechanism 100 to perform the sheet conveyance (e.g., the sheet conveyances T12-T16 of FIG. 7) to convey the sheet M at the medium conveyance amount TVm and to perform the partial printing after the sheet conveyance (e.g., the partial printings P12-P16 in FIG. 7) by multiple times. Next, the CPU 210 is configured to cause the printing mechanism 100 to perform the sheet conveyance (e.g., the sheet conveyances T21-T23 in FIG. 7) to convey the sheet M at the small conveyance amount TVs that is smaller than the medium conveyance amount TVm, and to perform the partial printings (e.g., the partial printings P21-P23 in FIG. 7) after the sheet conveyances. The CPU 210 is further configured to cause the printing mechanism 100 to perform the sheet conveyance (e.g., the sheet conveyance T31 in FIG. 7) to convey the sheet M at the large conveyance amount TVb that is larger than the medium conveyance amount TVm, and the partial printing (e.g., the partial printing P31 in FIG. 7) after the sheet conveyance (see FIG. 7 and the like). The CPU 210 is further configured to cause the printing mechanism 100 to perform the sheet conveyance (e.g., T31 in FIG. 7) to convey the sheet M at the large conveyance amount TVb to convey the sheet M from the start position (e.g., the sheet position M23 in FIG. 9) at which the upstream end of the sheet M is held by the holding members 146 to the end position (e.g., the sheet position M31 in FIG. 9) at which the upstream end of the sheet M is not held by the holding members 146 (see FIG. 9 and the like).

The CPU 210 is configured to adjust the number of sheet conveyances to convey the sheet M at the small conveyance amount TVs in such a manner that, when the sheet M is located at the start position of the sheet conveyance (e.g., T31) to convey the sheet M at the large conveyance amount TVb, the upstream end of the sheet M is located within the allowable area AA (e.g., FIGS. 7, 9-11, 13 and 14). In the example shown in FIGS. 7 and 9, the number of sheet conveyances T21-T23 to convey the sheet M at the small conveyance amount TVs is three, in the example shown in FIGS. 10 and 11, the number of conveyances T21-T24 to convey the sheet M at the small conveyance amount TVs is four, and in the example shown in FIGS. 13 and 14, the number of sheet conveyances T21-T25 to convey the sheet M at the small conveyance speed TVs is five. The allowable area AA is an area, the conveying direction AR, defined with respect to the holding members 146.

When the sheet M is a sheet unwound from the roll body and then cut, a part in the vicinity of the upstream end of the sheet M tends to be deformed during printing, which can cause problems with the sheet M coming into contact with the print head 110 (e.g., smudging or the sheet M). In particular, the problem is likely to occur before and after the sheet conveyance T31, in which the sheet M is conveyed from the start position where the upstream end of the sheet M is held by the holding members 146 to the end position where the upstream end of the sheet M is not held by the holding members 146. When the large conveyance amount TVb of the sheet conveyance T31 is made sufficiently large, the prohibited area NGA can be skipped over, thus avoiding this problem. However, in the multi-pass printing, the printing has to be established as described above, and there is a limit in increasing the large conveyance amount TVb. According to the present embodiment, the number of sheet conveyances at the small conveyance amount TVs is adjusted in such a manner that the upstream end of the sheet M in located within the allowable area AA at the start of the sheet conveyance T31 (e.g., M23 of FIG. 9, M24 of FIG. 11, M25 of FIG. 14), the position of the sheet M before and after the sheet conveyance T31 can be made to an appropriate position skipping over (i.e., leaving out) the prohibited area NGA (see FIGS. 9, 11 and 14). In other words, while establishing the multi-pass printing, it is possible to suppress the problem of the sheet M coming into contact with the print head 110.

More concretely, when the upstream end of the sheet M is located at a first position (i.e., a position separated from the allowable area AA by the distance d1 (see FIG. 9)) at the time of completion of the sheet conveyance T16, the CPU 210 executes the sheet conveyances T21-T23 at the small conveyance amount TVs by N times (N is an integer equal to or greater than one. N=3 in the example shown in FIG. 9). When the upstream and of the sheet M is located at a second position (i.e., a position separated from the allowable area AA by the distance d2 (see FIG. 11)) at the time of completion of the sheet conveyance T16, the CPU 210 executes the sheet conveyances T21-T24 at the small conveyance amount TVs by M times (M being an integer satisfying a condition M>N: M=4 in the example shown in FIG. 11). As a result, at the completion of the sheet conveyance T16, the more upstream the upstream end of the sheet M is, the greater the number of times the sheet is conveyed at a small conveyance amount TVs, thereby the position of the sheet M before and after the sheet conveyance T31 being set to an appropriate position skipping over (i.e., leaving out) the prohibited area (NGA).

According to the above embodiment, the sheet conveyance amount in each of the three sheet conveyances T21-T23 in the printing shown in FIG. 9, the four sheet conveyances T21-T24 in the printing shown in FIG. 11, and the five sheet conveyances T21-T25 in the printing shown in FIG. 14 is the same (i.e., the small conveyance amount TVs).

According to the above embodiment, when the four sheet conveyances T21-T24 are performed as in the example shown in FIG. 11, since it is only necessary to add another sheet conveyance with the same conveyance amount in comparison with a case where three sheet conveyances T21-T23 are performed as in the example shown in FIG. 9, controlling of the sheet conveyances is relatively easy. Similarly, as in the example shown in FIG. 14, when the five sheet conveyances T21-T25 are performed, since it is only necessary to add two additional sheet conveyances with the same conveyance amount in comparison with a case where the three sheet conveyances T21-T23 are performed as in the example shown in FIG. 9, controlling of the sheet conveyances is relatively easy.

Further, according to the embodiment described above, the printing shown in FIG. 10 is configured such that one sheet conveyance T24 is added after the three sheet conveyances T21-T23 shown in FIG. 7. In FIG. 10, a range of the nozzle in use NR2 (i.e., the hatched part) at the head position of P24 added after the sheet conveyance T24 is the same as the range of the nozzle in use NR1 (i.e., the hatched part) at the immediately previous head position P23. In other words, the multiple nozzles used in the partial printing (i.e., the partial printing at the head position of P24 in FIG. 10) after the additional one sheet conveyance T24 are the same as the multiple nozzles used in the partial printing executed after the sheet conveyance T24, which is the last conveyance operation among the three sheet conveyances T21-T23 (i.e., the partial printing performed at the head position of P23 in FIGS. 9 and 10). As a result, control of the partial printing at the head position of P24 that is added in association with the addition of the sheet conveyance T24 can be performed by repeatedly executing the control of the partial printing at the immediately previous head position of P23 (e.g., a routinized control). Therefore, the sheet conveyance T24 and the partial printing after the sheet conveyance T24 can be added easily.

Similarly, in the printing shown in FIG. 13, two sheet conveyances T24 and T25 are added after the three sheet conveyances T21-T23 in the printing shown in FIG. 7. In FIG. 13, the ranges NR2 and NR3 of the nozzles in use (i.e., the hatched parts) at the head positions of P24 and P25, which are added after the sheet conveyances T24 and T25, respectively, are the same as the range NR1 of the nozzles in use (i.e., the hatched part) at the immediately previous head position of P23. In other words, the multiple nozzles used in the partial printings respectively performed after the additional two sheet conveyances T24 and T25 (i.e., the partial printings at the head positions of P24 and P25 in FIG. 13) are the same as the multiple nozzles used in the partial printing performed after the sheet conveyance T23 that is the last conveying operation among the three sheet conveyances T21-T23 (i.e., the partial printing at the head position of P23 in FIGS. 9 and 13). As a result, the control of the partial printings at the head positions of P24 and P25 that are added in association with the addition of the sheet conveyances T24 and T25 can be performed by repeatedly executing the control of the partial printing at the immediately previous head position of P23. Therefore, the sheet conveyances T24 and T25, and the partial printings after the sheet conveyances T24 and T25 can be added easily.

Further, according to the above embodiment, the CPU 210 calculates the excess amount VO with respect to the reference position RP defined on the sheet M in the print data outputting process (S250 of FIG. 15B), and when the excess amount VO first exceeds zero (S255: YES), the CPU 210 determines the pass configuration thereafter in accordance with the excess amount VO (S260 of FIG. 15B). By introducing the excess amount VO in this way, the pass configuration for printing on a part in the vicinity of the upstream end of the sheet M can be determined at an appropriate timing before the process for printing on the part in the vicinity of the upstream end of the sheet M is started. As a result, the CPU 210 can generate the partial print data efficiently, based on the pass configuration in such a manner that processes of regenerating the partial print data would not be executed.

As is understood from the above description, the sheet conveyances T12-T16 at the medium conveyance amount TVm are examples of the first conveying operation, respectively, and the sheet conveyances T21-T25 at the small conveyance amount TVs are examples of the second conveying operation, respectively, and the sheet conveyance T31 at the large conveying amount TVb is an example of the third conveying operation.

B. Second Embodiment

Figure 16:
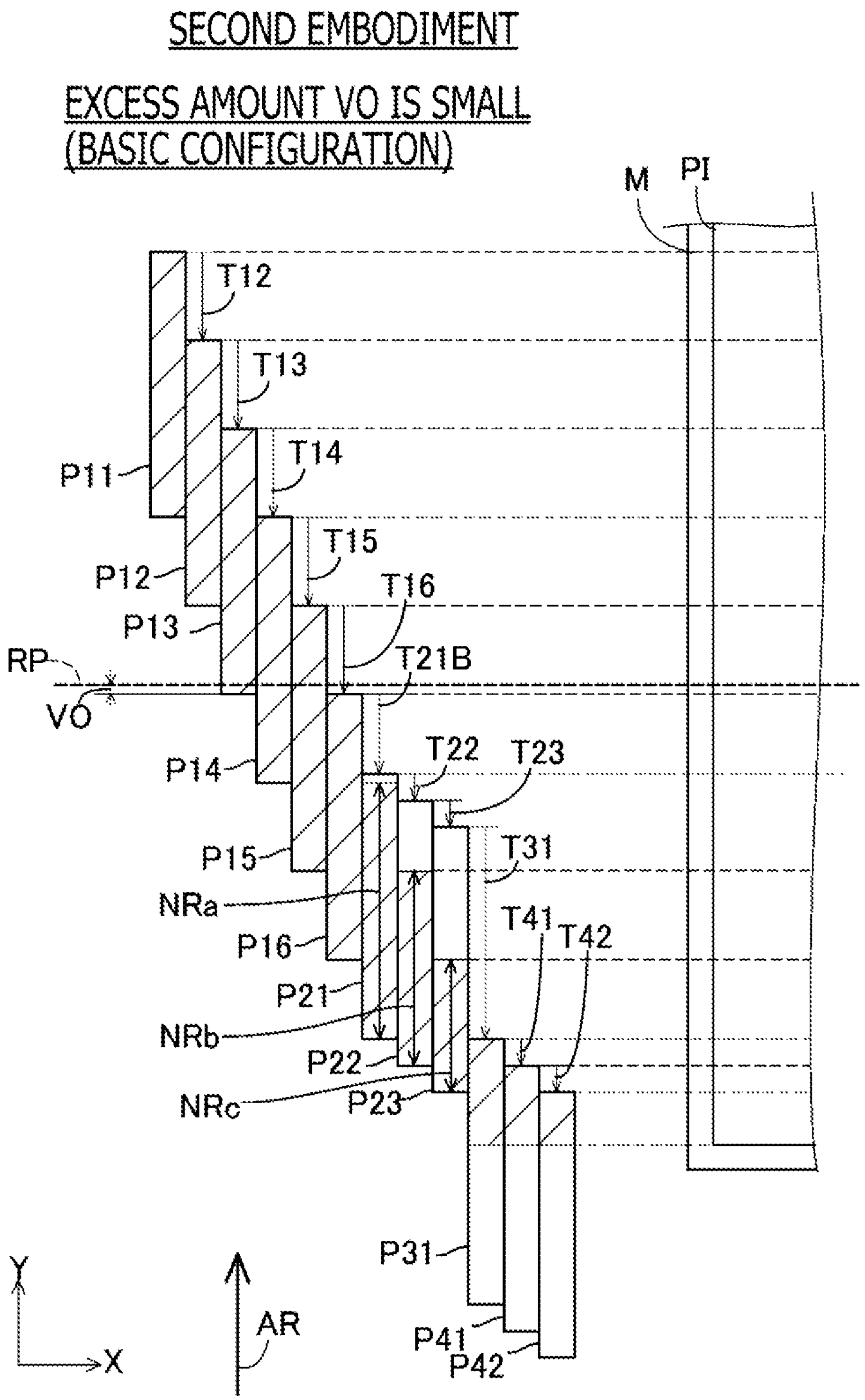
FIG. 16 is a first illustration of printing according to a second embodiment.
Figure 17:
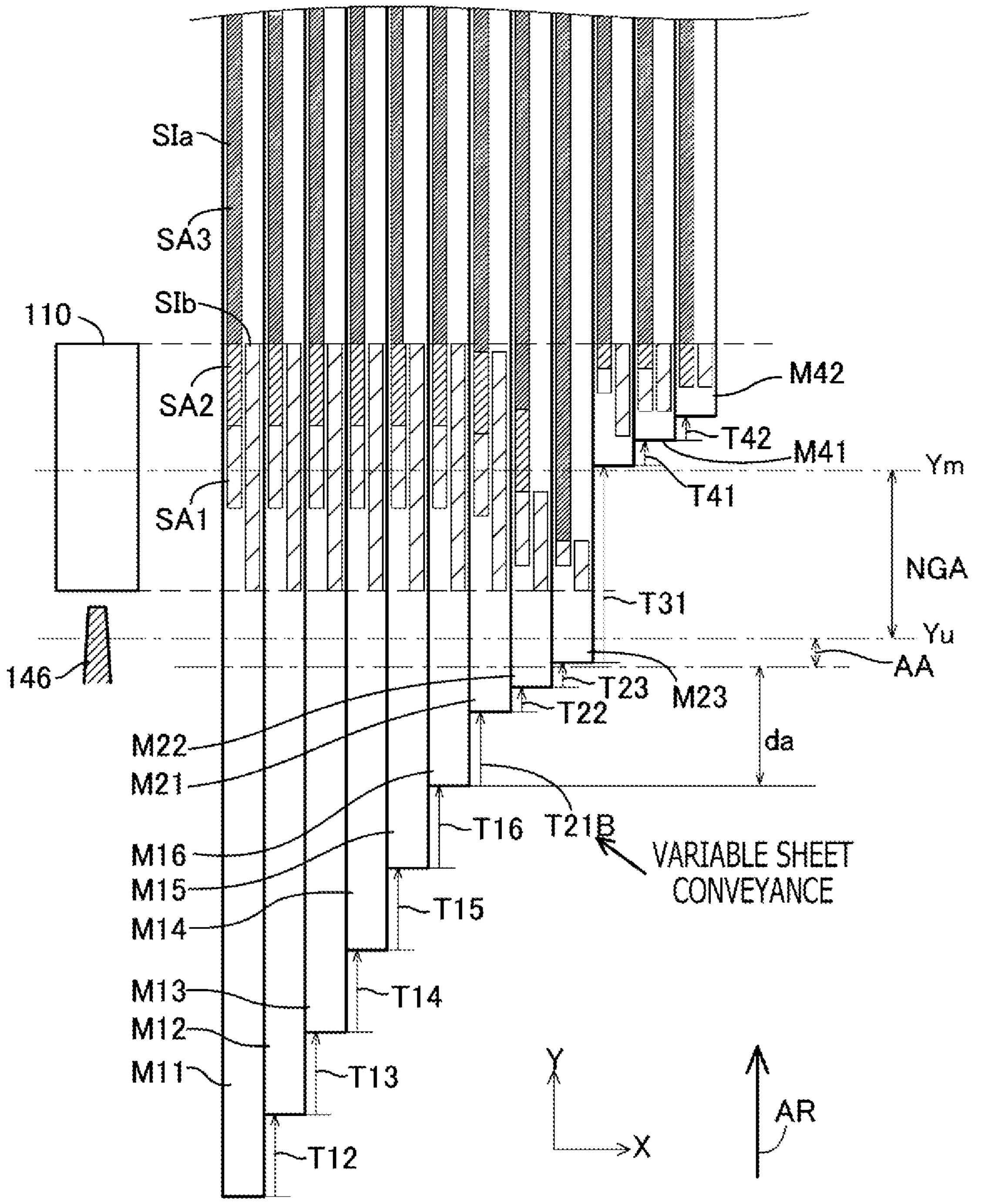
FIG. 17 is a second illustration of the printing according to the second embodiment.

FIG. 16 is a first illustration of a second embodiment. In FIG. 16, similar to FIG. 7, a position of the print head 110 relative to the sheet M is indicated. FIG. 17 is a second illustration of the second embodiment. In FIG. 17, similar to FIG. 9, the sheet position relative to the print head 110 and the holding members 146 is indicated. FIGS. 16 and 17 indicate the same printing.

Figure 18:
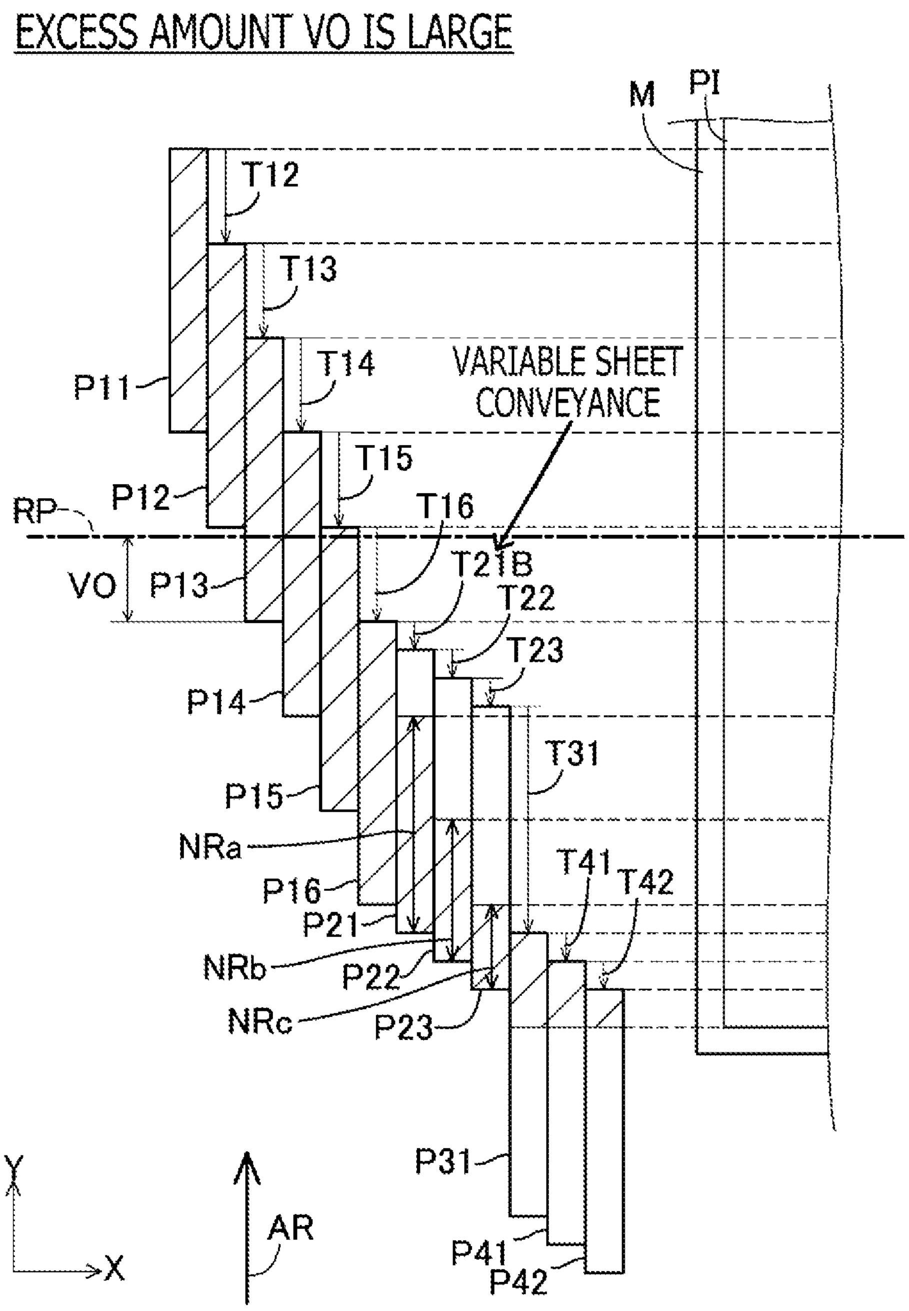
FIG. 18 is a third illustration of the printing according to the second embodiment.
Figure 19:
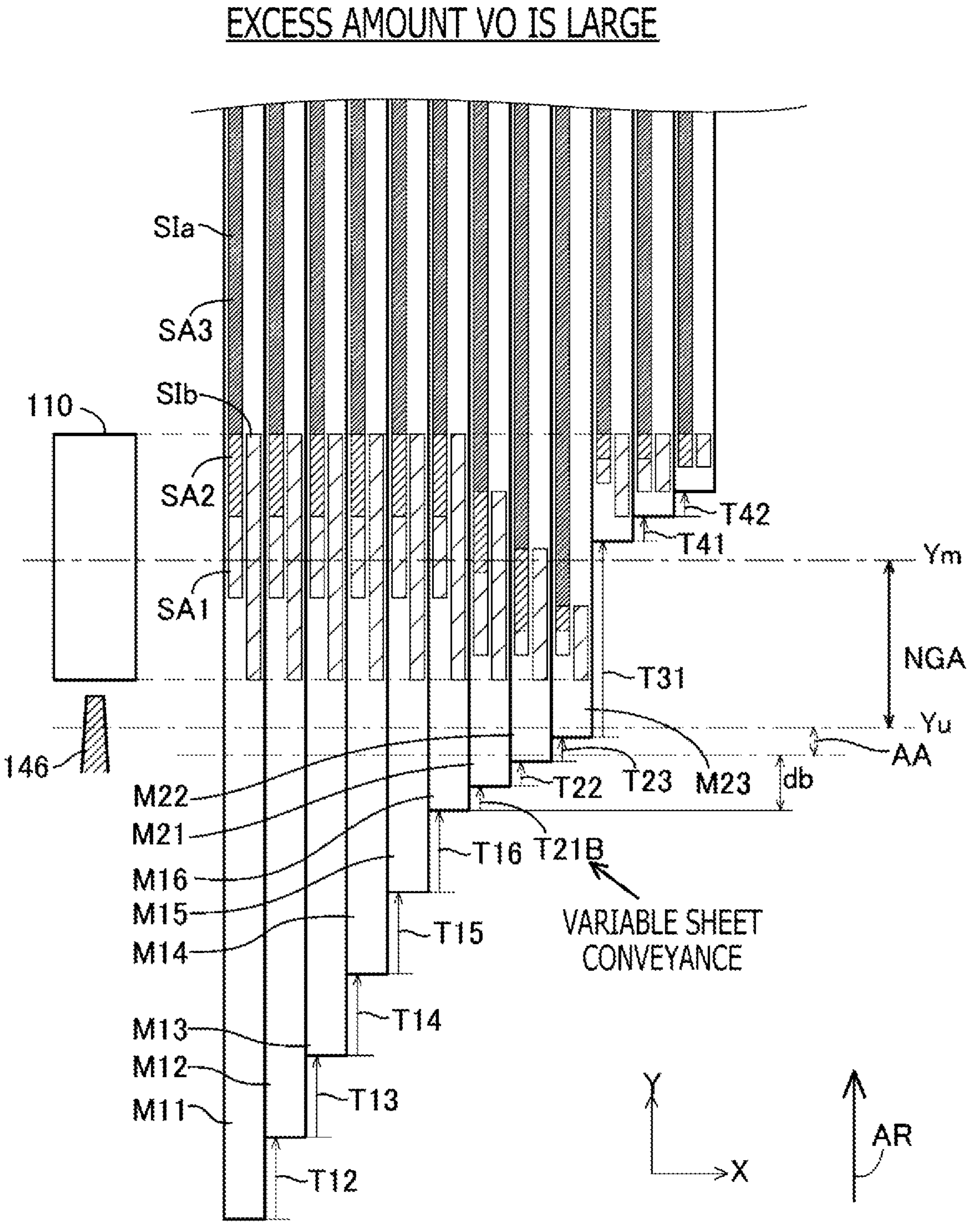
FIG. 19 is a fourth illustration of the printing according to the second embodiment.

FIG. 18 is a third illustration of the second embodiment. In FIG. 18, similar to FIG. 7, the position of the print head 110 relative to the sheet M is indicated. FIG. 19 is a fourth illustration of the second embodiment. In FIG. 19, similar to FIG. 9, the sheet position relative to the print head 110 and the holding members 146 is indicated. FIGS. 18 and 19 indicate the same printing, which is different from the printing indicated by FIGS. 16 and 17.

In the example shown in FIGS. 16 and 17, at a sheet position M16 after a sheet conveyance T16, the upstream end of the sheet M is spaced, on the upstream side, from the allowable area AA by a distance da. In the example shown in FIGS. 18 and 19, at the sheet position is M16 after the sheet conveyance T16, the upstream end of the sheet M is spaced, on the upstream side, from the allowable are AA by a distance db. The distance db is smaller than the distance da. As is explained in the first embodiment, the smaller the excess amount VO is, the larger the distance between the upstream end of the sheet M and the allowable area AA at the sheet position M16 after the sheet conveyance T16 (i.e., the distance da in FIG. 16, and the distance db in FIG. 19) is. As is understood from the above, the printing illustrated in FIGS. 16 and 17 is an example of the printing when the excess amount VO is relatively small, and the printing illustrated in FIGS. 18 and 19 is an example when the excess amount VO is larger than that of the printing illustrated in FIGS. 16 and 17.

The pass configuration after the partial printing at the sheet position of M16 (i.e., the partial printing at the head position of P16) in the second embodiment is different from that in the first embodiment. Concretely, the pass configuration determined in S260 of FIG. 15B in the second embodiment, which is the pass configuration to perform printing on a part in the vicinity of the upstream end of the sheet M, is different from that of the first embodiment.

In the first embodiment, depending on the excess amount VO (in other words, depending on the distances d1, d2, and d3 respectively indicated in FIG. 9, FIG. 11, FIG. 14), the number of sheet conveyances at the small conveyance amount TVs and the number of partial printings are adjusted. In contrast, according to the second embodiment, regardless of the excess amount VO, the number of sheet conveyances at the medium conveyance amount, and the number of the partial printings are fixed. In other words, according to the second embodiment, regardless of the excess amount VO, three sheet conveyances T21B, T22 and T23 at the small conveyance amount, one sheet conveyance T31 at the large conveyance amount TVb thereafter, and two sheet conveyances T41 and T41 at the small conveyance amount thereafter are performed after the partial printing at the head position of P16.

In the second embodiment, the sheet conveyance amount of the first one sheet conveyance T21B among the three sheet conveyances T21B, T22 and T23 is variable, while the sheet conveyance amounts of the remaining two sheet conveyances T22 and T23 are fixed. The sheet conveyance amounts of the last two sheet conveyances T41 and T42 at the small conveyance amount are also fixed. The fixed conveyance amount of the sheet conveyances T22, T23, T41 and T42 is the same as the small conveyance amount TVs in the first embodiment. The sheet conveyance T21B will also be referred to as a variable sheet conveyance T21B, and the conveyance amount of the variable sheet conveyance T21B will also be referred to as a variable conveyance amount TVv.

The variable conveyance amount TVv is equal to or greater than the fixed small conveyance amount TVs and less than the medium conveyance amount TVm (i.e., $TVs<TVv<TVm$) and varies depending on the excess amount VO (i.e., depending on the distances da and db in FIGS. 17 and 19). Concretely, the smaller the excess amount VO is, the larger the variable conveyance amount TVv is. Therefore, the larger the distance between the upstream end of the sheet M at the sheet position of M16 after the sheet conveyance T16 and the allowable area AA (e.g., the distance da in FIG. 17 or the distance db in FIG. 19), the larger the variable conveyance amount TVv is.

Concretely, the CPU 210 varies the variable conveyance amount TVv stepwise in accordance with the excess amount VO. In the present embodiment, the variable conveyance amount TVv is set to a multiple of the small conveyance amount TVs. It is assumed, for example, that the medium conveyance amount TVm that is the upper limit of the variable conveyance amount TVv is equal to or greater than three times and less than four times the small conveyance amount TVs. In this case, when $0<VO<TVs$, the variable conveyance amount TVv is set to 3TVs. When $TVs<VO<2TVs$, the variable conveyance amount TVv is set to 2TVs. When $2TVs<VO$, the variable conveyance amount TVv is set to TVs.

For example, in an example shown in FIGS. 16 and 17, the variable conveyance amount TVv of the variable sheet conveyance T21B is set to three times the small conveyance amount TVs (i.e., 3TVs). In an example shown in FIGS. 18 and 19, the variable conveyance amount TVv of the variable sheet conveyance T21B is set to the small conveyance amount TVs.

In order to avoid the complication of the drawings, in the present embodiment, it is assumed that the medium conveyance amount TVm is equal to or greater than three times and less than four times the small conveyance amount TVs (i.e., $3TVs<TVm<4TVs$), and that the variable conveyance amount TVv is varied in three steps. However, actually, the medium conveyance amount TVm is greater than four times the small conveyance amount TVs, and the variable conveyance amount TVv is varied in multiple steps (e.g., in four or more steps).

Figure 20A:
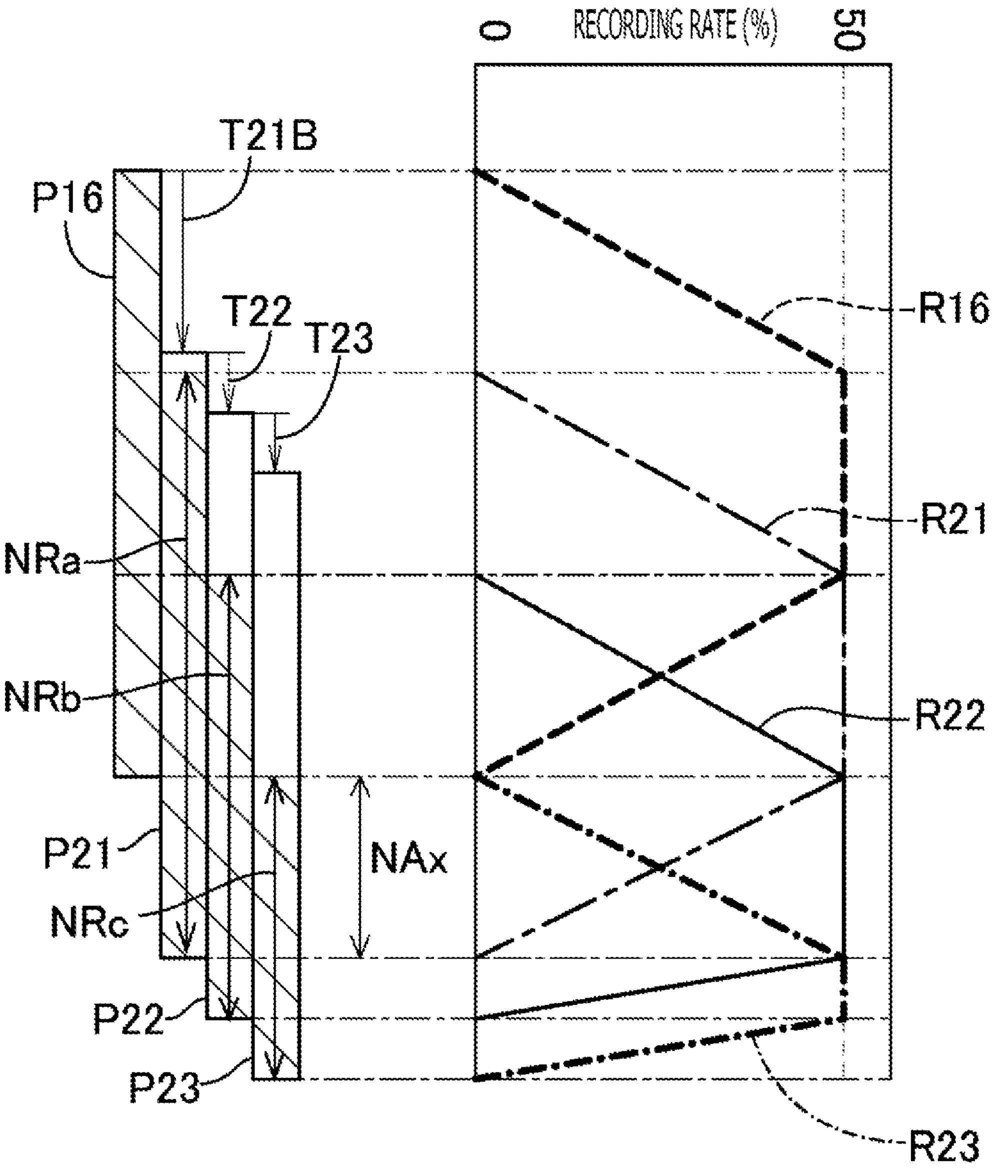
FIGS. 20A and 20B illustrate a recording rate of partial printing according to the second embodiment.
Figure 20B:
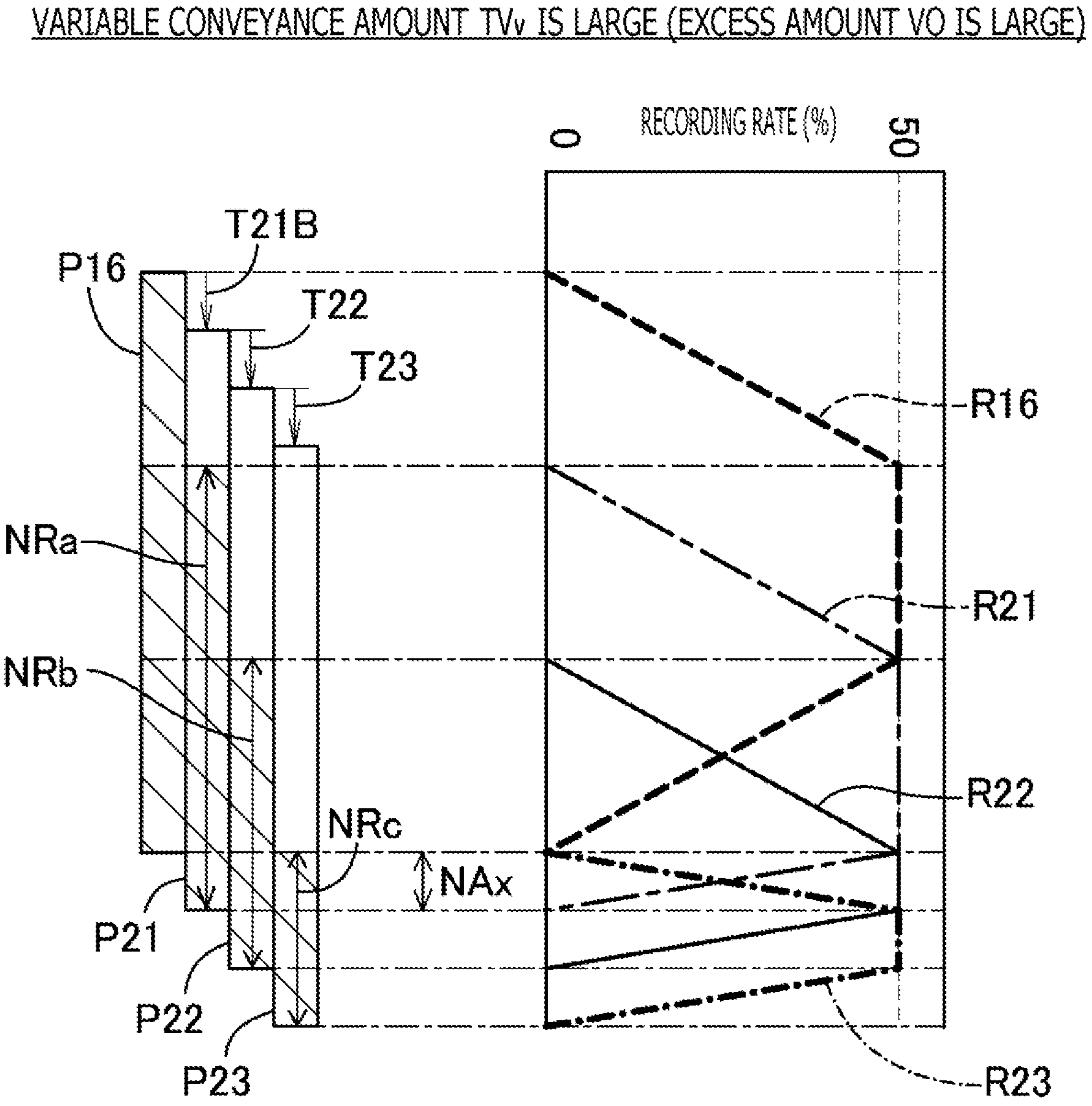

FIGS. 20A and 20B illustrate the recording rates of the partial printings according to the second embodiment. The recording rates R16 and R21-R23 are recording rates of dots in the partial printings executed at the head positions of P16 and P21-P24, respectively. In FIG. 20A, the recording rates in the examples of FIGS. 16 and 17, that is, the recording rates when the excess amount VO is small and the variable conveyance amount TVv of the sheet conveyance T21B is large are indicated. In FIG. 20B, the recording rates in the examples of FIGS. 18 and 19, that is, the recording rates when the excess amount VO is large and the variable conveyance amount TVv of the sheet conveyance T21B is small are indicated.

The larger the variable conveyance amount TVv is, the larger ranges of the nozzle in use NRa, NRb and NRc (i.e., the hatched parts) respectively for the three partial printings at the head positions of P21, P22 and P23 are. Accordingly, the larger the variable conveyance amount TVv is, the longer the lengths, in the conveying direction AR, of the partial areas on which printing is performed by the three partial printings at the head positions of P21, P22 and P23 are. For this purpose, when generating the partial print data for printing in the partial area NAx, the CPU 210 adjusts the recording rates R21 and R23. Concretely, the longer the partial area NAx, the more gradual the variation of the recording rates R21 and R23 along the conveying direction AR.

Further, in the second embodiment, the pass configuration with the large variable conveyance amount TVv, i.e., the pass configuration as shown in FIGS. 16 and 17 are referred to as a basic configuration, and the CPU 210 generates the partial print data by decreasing the variable conveyance amount TVv as the excess amount VO becomes larger. In this way, the length, in the conveying direction AR, of the partial area NAx (i.e., an area in which printing is performed, after the variable sheet conveyance T21B, by the three partial printings at the head positions of P21, P22 and P23) is maximum at the basic configuration, and becomes shorter as the excess amount VO becomes larger.

According to the second embodiment described above, the CPU 210 is configured to adjust the variable conveyance amount TVv of the sheet conveyance T21B (see FIGS. 16-19) in such a manner that the upstream end of the sheet M is located within the allowable area AA at the start position of the sheet conveyance at the large conveyance amount TVb (e.g., T31). As a result, similarly to the first embodiment, the position of the sheet M before and after the sheet conveyance T31 can be made to an appropriate position skipping over (i.e., leaving out) the prohibited area NGA (FIGS. 16-19). Therefore, without excessively increasing the large conveyance amount TVb, the problem of the sheet M coming into contact with the print head 110 can be suppressed without excessively increasing the large feed rate TVb. That is, while establishing the multi-pass printing, it is possible to suppress the problem of the sheet M coming into contact with the print head 110. Furthermore, the increase in the number of partial printings and the number of sheet conveyances can be suppressed, thereby reducing the increase in printing time.

Further concretely, when the upstream end of the sheet M is located at the first position (i.e., a position spaced from the allowable area AA by the distance da (see FIG. 16)) at the time when the sheet conveyance T16 has been completed, the CPU 210 sets the variable conveyance amount TVv of the sheet conveyance T21B to the first amount (e.g., 3TVs) (FIGS. 16 and 17). When the upstream end of the sheet M is located at the second position which is on the downstream side with respect to the first position (i.e., the position spaced from the allowable area AA by the distance db (see FIG. 19)) at the time when the sheet conveyance T16 has been completed, the CPU 210 sets the variable conveyance amount of the sheet conveyance T21B to the second amount (e.g., TVs) which is smaller than the first amount (FIGS. 18 and 19). As a result, the CPU 210 varies the variable conveyance amount TVv in such a manner that the more the upstream end of the sheet M is located on the downstream side at the time when the sheet conveyance T16 has been completed, the smaller the variable conveyance amount TVv is, thereby making the position of the sheet M before and after the sheet conveyance T31 at an appropriate position skipping over (i.e., leaving out) the prohibited area NGA.

Further, according to the present embodiment, when the variable conveyance amount TVv of the sheet conveyance T21B to the second amount that is smaller than the first amount, the ranges of the nuzzles in use NRa, NRb and NRc for the partial printings performed after the sheet conveyance T21B (FIGS. 20A and 20B) are set shorter in comparison with a case where the variable conveyance amount TVv of the sheet conveyance T21B is set to the first amount (see FIGS. 20A and 20B). In other words, when the variable conveyance amount TVv is set to the second amount, which is smaller than the first amount, the number of raster lines printed by partial printings executed after the sheet conveyance T21B is reduced compared to the case where the variable conveyance amount TVv is set to the first amount (FIGS. 20A and 20B). As a result, the control of the partial printing which is to be modified by making the variable conveyance amount TVv shorter than that of the basic configuration may only be necessary to reduce the number of raster lines to be processed in comparison with that in the basic configuration. Therefore, change of the variable conveyance amount TVv and change of the partial printings in association with the change of the variable conveyance amount can be achieved easily. Furthermore, since the required memory capacity does not increase with changes in the variable conveyance amount TVv, problems with memory capacity do not arise as long as the required memory capacity is secured in the basic configuration.

The multi-pass printing according to the present embodiment is a printing method in which the recording rate of at least one of the multiple partial printings for printing partial areas (e.g., the partial area NAx in FIGS. 20A and 20B) is varied depending on the printing position in the conveying direction AR (see FIGS. 20A and 20B). When adjusting the variable conveyance amount TVv, the CPU 210 adjusts the recording rate in the partial printing after the sheet conveyance T21B at the variable conveyance amount TVv according to the adjustment of the variable conveyance amount TVv. Concretely, as described with reference to FIGS. 20A and 20B, the recording rates R21 and R23 when the partial area NAx of which lengths vary depending on the adjustment of the variable conveyance amount TVv are adjusted. As a result, even in a case where the variable conveyance amount TVv is adjusted, the multi-pass printing can be executed appropriately, thus, for example, reducing image quality degradation due to banding.

As is understood from the above, the sheet conveyances T12-T16 at the medium conveyance amount TVm are examples of the first conveyance operation, respectively, while the sheet conveyance T21B at the variable conveyance amount TVv and the sheet conveyances T22 and T23 at the small conveyance amount TVs are examples of the second conveyance operation, respectively, and the sheet conveyance T31 at the large conveyance amount TVb is an example of the third conveyance operation. Further, the sheet conveyance T21B at the variable conveyance amount TVv is an example of a particular second conveyance operation.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

C. Modifications (1) In each of the above-described embodiment, the multi-pass printing is employed in which each of multiple and consecutive raster lines in the conveying direction AR is divided into three consecutive parts and printed in three separate partial printings. Instead the above configuration, another multi-pass printing may be employed. In this another multi-pass printing, among the three consecutive raster lines aligned in the conveying direction AR, the first raster line is printed in the first partial printing, the second raster line is printed in the second partial printing, and the third raster line is printed in the third partial printing. With this configuration, the print resolution in the conveying direction AR can be set to a resolution (e.g., 900 dpi) higher than the resolution corresponding to the nozzle distance NT (e.g., 300 dpi) (FIG. 4).

Furthermore, the number of passes for the multi-pass printing, which is 3 in the present embodiment, may be 2, or an integer greater than or equal to 4. In other words, the multi-pass printing may be employed, where each of the multiple raster lines continuous in the conveying direction AR is divided into two, four or more partial printings. That is, the multi-pass printing may be employed, where each of the multiple raster lines continuous in the conveying direction AR is divided into two, four or more partial printings.

(2) In the first embodiment, the number of sheet conveyances at the small conveyance amount TVs is adjusted in such a manner that the sheet positions before and after the sheet conveyance T31 at the large conveyance amount TVb leave out (i.e., skip over) the prohibited area NGA. In the second embodiment, the variable conveyance amount TVv of the sheet conveyance T21B is adjusted in such a manner that the sheet positions before and after the sheet conveyance T31 leave out (i.e., skip over) the prohibited area NGA.

By combining the first embodiment and second embodiment and, for example, the number of sheet conveyances at the small conveyance amount TVs and the conveyance amounts of the sheet conveyances are both performed in such a manner that the sheet positions before and after the sheet conveyance T31 leave out (i.e., skip over) the prohibited area NGA. For example, as in the first embodiment, the CPU 210 may roughly adjust the sheet positions before and after the sheet conveyance T31 by adjusting the number of sheet conveyances at the small conveyance amount, and further, as in the second embodiment, the CPU 210 may minutely adjust the sheet positions before and after the sheet conveyance T31 by minutely adjusting the conveyance amount of the sheet conveyance at the initial small conveyance amount.

(3) In the second embodiment, the variable conveyance amount TVv is adjusted stepwise in accordance with the excess amount VO. Instead, the variable conveyance amount TVv may be continuously adjusted in accordance with the excess amount VO. For example, every time when the excess amount VO is decreased by one raster line, the variable conveyance amount TVv may be increased by one raster line.

(4) In the second embodiment, the number of the sheet conveyances at the small conveyance amount TVs is adjusted between three times to five times. A range of the adjustable number of times is arbitrary and is not limited to the number of times as above. The number of times of the sheet conveyances at the small conveyance amount TVs may be adjusted, for example, between two and six times, or between four and seven times.

(5) In the multi-pass printing in the above-described embodiments, the recording rate for each partial printing changes in accordance with the position, in the conveying direction AR, of the raster line to be printed (FIGS. 8, 20A and 20B). Instead, the recording rate of each partial printing may be a fixed value (e.g., ⅓) regardless of the position, in the conveying direction AR, of the raster line to be printed.

(6) The concrete configuration of the printer 200 illustrated above with reference to FIGS. 2-5 is an example, and is not necessarily be limited to the same. For example, a position where the sheet cutter 150 is arranged may be another position between the roll mount 11 and the print head 110. For example, the sheet cutter 150 may be arranged between the intermediate roller pair 142 and the conveying roller pair 143, or attached to the guide member 147 or the guide member 148. Further, a configuration to hold the sheet M in a corrugated manner is not necessarily limited to that shown in FIG. 5, but another configuration may be employed.

(7) The printing process shown in FIG. 6 and the print data outputting process shown in FIGS. 15A and 15B are only examples and the configuration are not necessarily limited to those shown in the drawings. For example, in the processes shown in FIGS. 6, 15A and 15B, the entire image data is converted into the print data (S130 of FIG. 6), and then the print data outputting process shown in FIGS. 15A and 15B is executed. Alternatively, for example, the conversion of print data may be performed for each raster data each time the raster data is obtained at S200 in FIGS. 15A and 15B. Furthermore, in the print data outputting process, the raster data is sequentially assigned to the nozzles in use, and each time the assignment for one partial printing is completed, the assigned raster data group is output as the partial print data for one partial printing. Instead, the print data may be divided to generate all partial print data, and the output of partial print data and conveyance amount data may be done after determining the conveyance amount for all the sheet conveyances.

(8) As the printing medium, instead of the sheet M, another sheet type printing medium (e.g., a roll body formed by winding a resin film or cloth) may be employed.

(9) In the above-described embodiments, the controller which executes the printing process shown in FIG. 6 is the CPU 210. Alternatively, the controller may be another type of device (e.g., a terminal device 300 of a user). In such a case, for example, the terminal device 300 operates as a printer driver by executing a driver program, and executes the printing process shown in FIG. 6 as a part of the function of the printer driver. In this case, the terminal device causes the printer 200 to perform printing by supplying the partial print data and the conveyance amount data to the printer 200 which serves as a print execution device.

(10) The controller which executes the printing process shown in FIG. 6 may be a server which, for example, is configured to obtain image data from the printer 200 or the terminal device 300, generate the above-mentioned partial print data and the conveyance amount data using the image data, and transmit the thus generated data to the printer 200. Such a server may be a plurality of computers which are communicable with each other through a network (e.g., a cloud server).

(11) In each of the above embodiments, a part of the configuration realized by hardware may be replaced with software, or conversely, a part or all of the configuration realized by software may be replaced with hardware. For example, some parts of the printing process in FIG. 6 may be realized by dedicated hardware circuitry (e.g., ASIC) that operates according to the instructions of CPU 210.

The above description referring to the embodiments and modifications is intended to facilitate understanding of aspects of the present disclosures and is not intended to limit the aspects. The configuration described above may be modified and/or improved without departing from aspects of the present disclosures.

What is claimed is:

1. A printing device, comprising:

a housing;

a print head provided in the housing;

a mount to which a roll body is detachably mounted, the roll body being a sheet type printing medium wounded into a rolled-up state;

a conveyor configured to convey the printing medium unwounded from the roll body in a conveying direction along a conveying path including an upstream path extending from the mount to the print head; and a cutter configured to cut the printing medium at a particular position in the upstream path, wherein the conveyor comprises a holder arranged, in the upstream path, at a position between the cutter and the print head, wherein the holder is configured to hold the printing medium in a state where the printing medium is deformed to be corrugated along a direction perpendicular to the conveying direction, wherein the print head comprises multiple nozzles configured to eject ink of particular colors, respectively, the multiple nozzles being arranged in such a manner that positions of the multiple nozzles are different from each other in the conveying direction, each of the multiple nozzles being configured to eject ink to form dots on the on the printing medium, wherein the printing device further comprises a controller configured to perform multi-pass printing, the multi-pass printing being printing of executing partial printing of forming dots using the print head and sheet conveyance of conveying the printing medium using the conveyor, alternately and repeatedly, to print multiple raster lines consecutive in the conveying direction by the multiple partial printings, wherein the controller is configured to perform:

a first conveyance operation of conveying the printing medium, and the partial printing after the first conveyance operation by multiple times;

a second conveyance operation of conveying the printing medium by a conveyance amount smaller than a conveyance amount in the first conveyance operation, and the partial printing after the second conveyance operation; and a third conveyance operation of conveying the printing medium by a conveyance amount larger than the conveyance amount in the first conveyance operation, and the partial printing after the third conveyance operation;

the third conveyance operation being an operation of conveying the printing medium from a start position to an end position, the start position being a position at which an upstream end of the printing medium is held by the holder, the end position being a position at which the upstream end of the printing medium is not held by the holder, wherein the controller is configured to adjust at least one of a number of the second conveyance operation and the conveyance amount in the second conveyance operation in such a manner that the upstream end of the printing medium is located within a particular range when the printing medium is located at the start position of the third conveyance operation, and wherein the particular range is a range set to the holder in the conveying direction.

2. The printing device according to claim 1, wherein the controller is configured to adjust the number of the second conveyance operation in such a manner that the upstream end of the printing medium is located within the particular range when the printing medium is located at the start position of the third conveyance operation.

3. The printing device according to claim 2, wherein the controller is configured to perform:

the second conveyance operation by N times in a first case where the upstream end of the printing medium is located at a first position at a time when the first conveyance operation has been completed; and the second conveyance operation by M times in a second case where the upstream end of the printing medium is located at a second position at a time when the first conveyance operation has been completed, the second position being a position upstream of the first position in the conveying direction, M being larger than N.

4. The printing device according to claim 3, wherein a conveyance amount in the second conveyance operation performed by N times in the first case is a same as a conveyance amount in the second conveyance operation, which is performed by M times in the second case.

5. The printing device according to claim 3, wherein the controller is configured to perform the second conveyance operation by (M−N) times, additionally, after performing the second conveyance operation by N times in a case where performing the second conveyance operation by M times in the second case, and wherein multiple nozzles of the print head, which is used in the partial printing performed after each of the additionally performed second conveyance operation for (M−N) times are a same as multiple nozzles of the print head, which is used in the partial printing performed after a last conveyance operation among the second conveyance operation for N times.

6. The printing device according to claim 1, wherein the holder comprises multiple ribs configured to support the printing medium from below and multiple holding members configured to hold the printing medium from above, positions of the multiple ribs in a particular direction perpendicular to the conveying direction being different from each other, positions of the multiple holding members in the particular direction being different from each other, and wherein a position of each of the multiple holding members in the particular direction is positioned between two adjacent ribs among the multiple ribs.

7. The printing device according to claim 1, wherein the controller is configured to adjust the conveyance amount in the second conveyance operation in such a manner that the upstream end of the printing medium is located within the particular range when the printing medium is located at the start position of the third conveyance operation.

8. The printing device according to claim 7, wherein the controller is configured to:

set a conveyance amount in the second conveyance operation to a first amount in a first case where the upstream end of the printing medium is located at a first position at a time when the first conveyance operation has been completed; and set a conveyance amount in the second conveyance operation to a second amount in a second case where the upstream end of the printing medium is located at a second position at a time when the first conveyance operation has been completed, the second position being a position downstream of the first position in the conveying direction, the second amount being smaller than the first amount.

9. The printing device according to claim 8, wherein, in a case where setting set the conveyance amount in the second conveyance operation to the second amount, the controller is configured to set a number of raster lines, which is to be printed in the partial printing performed after the second conveyance, smaller than a number of raster lines, which is to be printed in the partial printing performed when setting set the conveyance amount in the second conveyance operation to the first amount.

10. The printing device according to claim 7, wherein the multi-pass printing is printing that a recording rate of at least one of the multiple partial printings for printing a particular area is varied depending on a position in the conveying direction, and wherein the controller is, when adjusting the conveyance amount in the second conveyance operation, configured to adjust the recording rate of the partial printing performed after the second conveyance operation according to the adjustment of the conveyance amount.

11. A non-transitory computer-readable recording medium for controlling a printing device, the non-transitory computer-readable storage medium containing computer-executable instructions, wherein the printing device comprises:

a housing;

a print head provided in the housing;

a mount to which a roll body is detachably mounted, the roll body being a sheet type printing medium wounded into a rolled-up state;

a conveyor configured to convey the printing medium unwounded from the roll body a conveying direction along a conveying path including an upstream path extending from the mount to the print head; and a cutter configured to cut the printing medium at a particular position in the upstream path, wherein the conveyor comprises a holder arranged, in the upstream path, at a position between the cutter and the print head, wherein the holder is configured to hold the printing medium in a state where the printing medium is deformed to be corrugated along a direction perpendicular to the conveying direction, wherein the print head comprises multiple nozzles configured to eject ink of particular colors, respectively, the multiple nozzles being arranged in such a manner that positions of the multiple nozzles are different from each other in the conveying direction, each of the multiple nozzles being configured to eject ink to form dots on the on the printing medium, wherein the computer-executable instructions realizes a controlling function, the controlling function causing, when executed by a controller of the printing device, the printing device to perform multi-pass printing, the multi-pass printing being printing of executing partial printing of forming dots using the print head and sheet conveyance of conveying the printing medium using the conveyor, alternately and repeatedly, to print multiple raster lines consecutive in the conveying direction by the multiple partial printings, wherein the controlling function causes, when executed by the controller, the printing device to perform:

a first conveyance operation of conveying the printing medium, and the partial printing after the first conveyance operation by multiple times;

a second conveyance operation of conveying the printing medium by a conveyance amount smaller than a conveyance amount in the first conveyance operation, and the partial printing after the second conveyance operation; and a third conveyance operation of conveying the printing medium by a conveyance amount larger than the conveyance amount in the first conveyance operation, and the partial printing after the third conveyance operation;

the third conveyance operation being an operation of conveying the printing medium from a start position to an end position, the start position being a position at which an upstream end of the printing medium is held by the holder, the end position being a position at which the upstream end of the printing medium is not held by the holder, wherein the controlling function further causes, when executed by the controller, the printing device to perform adjusting at least one of a number of the second conveyance operation and the conveyance amount in the second conveyance operation in such a manner that the upstream end of the printing medium is located within a particular range when the printing medium is located at the start position of the third conveyance operation, and wherein the particular range is a range set to the holder in the conveying direction.

* * * * *